United States Patent
Cui et al.

(10) Patent No.: US 10,244,387 B2
(45) Date of Patent: Mar. 26, 2019

(54) DEVICE AND METHOD IN WIRELESS COMMUNICATION SYSTEM

(71) Applicant: SONY CORPORATION, Tokyo (JP)

(72) Inventors: Qimei Cui, Beijing (CN); Qinyan Jiang, Beijing (CN); Weijuan Gao, Beijing (CN); Zhongbin Qin, Beijing (CN); Tong Zhang, Beijing (CN); Hui Liang, Beijing (CN)

(73) Assignee: SONY CORPORATION, Tokyo (JP)

( * ) Notice: Subject to any disclaimer, the term of this patent is extended or adjusted under 35 U.S.C. 154(b) by 13 days.

(21) Appl. No.: 15/503,274

(22) PCT Filed: Aug. 25, 2015

(86) PCT No.: PCT/CN2015/088001
§ 371 (c)(1),
(2) Date: Feb. 10, 2017

(87) PCT Pub. No.: WO2016/045477
PCT Pub. Date: Mar. 31, 2016

(65) Prior Publication Data
US 2017/0265068 A1 Sep. 14, 2017

(30) Foreign Application Priority Data
Sep. 24, 2014 (CN) .......................... 2014 1 0493892

(51) Int. Cl.
*H04W 4/00* (2018.01)
*H04W 8/26* (2009.01)
*H04W 24/02* (2009.01)
*H04L 5/00* (2006.01)
*H04L 29/12* (2006.01)
(Continued)

(52) U.S. Cl.
CPC ............. *H04W 8/26* (2013.01); *H04L 5/0048* (2013.01); *H04L 61/3005* (2013.01);
(Continued)

(58) Field of Classification Search
None
See application file for complete search history.

(56) References Cited

U.S. PATENT DOCUMENTS

| 8,194,603 B2 * | 6/2012 | Nimbalker | H04L 5/001 370/329 |
| 2011/0110347 A1 * | 5/2011 | Mun | H04W 16/02 370/338 |

(Continued)

FOREIGN PATENT DOCUMENTS

| CN | 101990210 A | 3/2011 |
| CN | 101998388 A | 3/2011 |

(Continued)

OTHER PUBLICATIONS

International Search Report dated Dec. 2, 2015 in PCT/CN2015/088001 Filed Aug. 25, 2015.

*Primary Examiner* — Phirin Sam
(74) *Attorney, Agent, or Firm* — Xsensus, LLP

(57) ABSTRACT

A device and method in a wireless communication system, the device including an access determination unit configured to determine an access requirement of a user equipment (UE); and a control unit configured to switch a target small cell of the device from a closed state to an open state based on the access requirement of the UE, and reallocate to the target small cell a new physical cell identifier different from the physical cell identifier used in the closed state. A physical cell identifier can be dynamically allocated in accordance with the open/closed state of the small cell, reducing the burden of cell planning and maintenance cost, and having greater flexibility.

9 Claims, 17 Drawing Sheets

(51) Int. Cl.
  *H04W 48/16* (2009.01)
  *H04W 52/02* (2009.01)
  *H04W 56/00* (2009.01)
  *H04W 64/00* (2009.01)

(52) U.S. Cl.
  CPC ........... *H04W 24/02* (2013.01); *H04W 48/16* (2013.01); *H04W 52/0206* (2013.01); *H04W 56/0015* (2013.01); *H04W 64/003* (2013.01); *Y02D 70/122* (2018.01); *Y02D 70/1262* (2018.01); *Y02D 70/1264* (2018.01); *Y02D 70/21* (2018.01); *Y02D 70/26* (2018.01)

(56) References Cited

U.S. PATENT DOCUMENTS

| | | | |
|---|---|---|---|
| 2012/0015657 A1 | 1/2012 | Comsa et al. | |
| 2012/0021725 A1* | 1/2012 | Rune | H04W 48/16 455/411 |
| 2013/0150056 A1* | 6/2013 | Yi | H04W 36/04 455/444 |
| 2014/0242963 A1* | 8/2014 | Novlan | H04W 48/16 455/418 |
| 2015/0056989 A1* | 2/2015 | Lee | H04W 48/16 455/434 |
| 2015/0092768 A1* | 4/2015 | Ng | H04W 48/16 370/350 |
| 2015/0312784 A1* | 10/2015 | You | H04L 1/0693 370/252 |
| 2015/0365790 A1* | 12/2015 | Edge | H04W 4/90 455/404.2 |

FOREIGN PATENT DOCUMENTS

| | | |
|---|---|---|
| CN | 101998468 A | 3/2011 |
| CN | 103581915 A | 2/2014 |

* cited by examiner

DEVICE AND METHOD IN WIRELESS COMMUNICATION SYSTEM

FIELD

The disclosure relates to the field of wireless communication technology, and in particular to a device and a method in a wireless communication system for dynamically managing Physical cell IDs (PCIs) during deployment and turning on/turning off of small cells, as well as to a cell search and access procedure in this case.

BACKGROUND

A Physical cell ID (PCI) may be used for identifying an evolved node B (eNB)/small cell in a physical layer. Since in a LTE-A system, the PCI is closely related to mechanisms such as scrambling sequence generation, cell search and resource mapping, the PCI plays an important role in the physical layer.

The PCI is critical information for scrambling sequence generation in the physical channel, and plays a key role in reducing interferences in a control channel and a broadcast channel. Meanwhile, the PCI corresponds to a Primary Synchronization Signal (PSS)/Secondary Synchronization Signal (SSS) sequence, a Cell-specific Reference Signal (CRS), and the like, and is closely related to frequency offset values of the CRS and control channel resource mapping. Therefore, in order to avoid interferences between neighboring cells, and particularly to avoid interferences between intra frequency cells, it is required to reasonably allocate 504 PCIs.

In the conventional technology, in order to suitably allocate PCIs, a planning method is primarily adopted, where a fixed PCI is allocated to a cell when the cell is initially deployed, and manual configuration is required if the PCI needs to be changed. In a scenario of ultra-dense deployment of small cells, interferences between small cells are more severe. Therefore, the method in the conventional technology may cause a high maintenance cost and a great burden on cell planning and lacks flexibility, thus it is difficult for the method to be adapted to automatic configuration mechanisms such as a plug-and-play mechanism, and to meet requirements of an unplanned small cell deployment scenario which is even more flexible.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above issues, an object of the disclosure is to provide a device and a method in a wireless communication system for dynamically managing PCIs during deployment and turning on/turning off of small cells, which overcome problems in the conventional technology, reduce the maintenance cost and the burden on cell planning, and improve the flexibility.

According to an aspect of the disclosure, it is provided a device in a wireless communication system, which includes: an access determination unit configured to determine an access requirement of a user equipment; and a control unit configured to transform a target small cell in which the device locates from an off state to an on state and re-allocate a new PCI which is different from a PCI used in the off state to the target small cell, based on the access requirement of the user equipment.

According to another aspect of the disclosure, it is also provided a device in a wireless communication system, which includes: a judgment unit configured to judge whether a user equipment needs to get access to a target small cell among neighboring small cells from a serving cell in which the device locates according to measurement results for discovery reference signals of the neighboring small cells by the user equipment, the user equipment being served by the serving cell; a transceiving unit configured to transmit an access request to the target small cell and receive a response to the access request from the target small cell, in a case that the judgment unit judges that the user equipment needs to get access to the target small cell from the serving cell; and an instruction unit configured to transmit an instruction to the user equipment according to the response, such that the user equipment gets access to the target small cell according to a new PCI of the target small cell, where the instruction includes control information for getting access to the target small cell. Preferably, the new PCI of the target small cell is a PCI newly allocated to the target small cell when the target small cell transforms from an off state to an on state and is different from a PCI used in the off state.

According to another aspect of the disclosure, it is also provided a device on user equipment side in a wireless communication system, which includes: a transceiving unit configured to transmit measurement results for discovery reference signals of neighboring small cells by the user equipment to a serving cell and receive from the serving cell an access instruction about getting access to a target small cell among the neighboring small cells, where the serving cell is a cell serving the user equipment currently; and a control unit configured to acquire a new PCI of the target small cell based on the access instruction, so as to control the user equipment to get access to the target small cell according to the new PCI. Preferably, the new PCI of the target small cell is a PCI newly allocated to the target small cell when the target small cell transforms from an off state to an on state and is different from a PCI used in the off state.

According to another aspect of the disclosure, it is also provided a device in a wireless communication system, which includes: a grouping unit configured to group PCIs according to values of the PCIs in a predetermined grouping manner; and a PCI allocation unit configured to dynamically allocate, according to at least the grouping of the PCIs, a PCI to each small cell in a small cell cluster based on on/off state of each small cell in the small cell cluster. Preferably, a PCI of each small cell in the off state is different from a PCI of the small cell in the on state.

According to another aspect of the disclosure, it is also provided a method in a wireless communication system, which includes: an access determination step of determining an access requirement of a user equipment; and a control step of transforming a target small cell from an off state to an on state and re-allocating a new PCI which is different from a PCI used in the off state to the target small cell, based on the access requirement of the user equipment.

According to another aspect of the disclosure, it is also provided a method in a wireless communication system, which includes: a judgment step of judging whether a user equipment needs to get access to a target small cell among neighboring small cells from a serving cell in which the device locates according to measurement results for discovery reference signals of the neighboring small cells by the user equipment, the user equipment being served by the serving cell; a transceiving step of transmitting an access request to the target small cell and receiving a response to the access request from the target small cell, in a case that it is judged that the user equipment needs to get access to the target small cell from the serving cell; and an instructing step of transmitting an instruction to the user equipment according to the response, such that the user equipment gets access to the target small cell according to a new PCI of the target small cell, where the instruction includes control information for getting access to the target small cell. Preferably, the new PCI of the target small cell is a PCI newly allocated to the target small cell when the target small cell transforms from an off state to an on state and is different from a PCI used in the off state.

According to another aspect of the disclosure, it is also provided a method in a wireless communication system, which includes: a transceiving step of transmitting measurement results for discovery reference signals of neighboring small cells by a user equipment to a serving cell and receiving from the serving cell an access instruction about getting access to a target small cell among the neighboring small cells, where the serving cell is a cell serving the user equipment currently; and a control step of acquiring a new PCI of the target small cell based on the access instruction, so as to control the user equipment to get access to the target small cell according to the new PCI. Preferably, the new PCI of the target small cell is a PCI newly allocated to the target small cell when the target small cell transforms from an off state to an on state and is different from a PCI used in the off state.

According to another aspect of the disclosure, it is also provided a method in a wireless communication system, which includes: a grouping step of grouping PCIs according to values of the PCIs in a predetermined grouping manner; and a PCI allocation step of dynamically allocating, according to at least the grouping of the PCIs, a PCI to each small cell in a small cell cluster based on on/off state of each small cell in the small cell cluster. Preferably, a PCI of each small cell in the off state is different from a PCI the small cell in the on state.

According to another aspect of the disclosure, it is also provided a storage medium which includes machine-readable program codes which, when being executed on an information processing apparatus, cause the information processing apparatus to perform a method including: an access determination step of determining an access requirement of a user equipment; and a control step of transforming a target small cell from an off state to an on state and re-allocating a new PCI which is different from a PCI used in the off state to the target small cell, based on the access requirement of the user equipment.

According to another aspect of the disclosure, it is also provided a storage medium which includes machine-readable program codes which, when being executed on an information processing apparatus, cause the information processing apparatus to perform a method including: a judgment step of judging whether a user equipment needs to get access to a target small cell among neighboring small cells from a serving cell in which the device locates according to measurement results for discovery reference signals of the neighboring small cells by the user equipment, the user equipment being served by the serving cell; a transceiving step of transmitting an access request to the target small cell and receiving a response to the access request from the target small cell, in a case that it is judged that the user equipment needs to get access to the target small cell from the serving cell; and an instructing step of transmitting an instruction to the user equipment according to the response, such that the user equipment gets access to the target small cell according to a new PCI of the target small cell, where the instruction includes control information for getting access to the target small cell. Preferably, the new PCI of the target small cell is a PCI newly allocated to the target small cell when the target small cell transforms from an off state to an on state and is different from a PCI used in the off state.

According to another aspect of the disclosure, it is also provided a storage medium which includes machine-readable program codes which, when being executed on an information processing apparatus, cause the information processing apparatus to perform a method including: a transceiving step of transmitting measurement results for discovery reference signals of neighboring small cells by a user equipment to a serving cell and receiving from the serving cell an access instruction about getting access to a target small cell among the neighboring small cells, where the serving cell is a cell serving the user equipment currently; and a control step of acquiring a new PCI of the target small cell based on the access instruction, so as to control the user equipment to get access to the target small cell according to the new PCI. Preferably, the new PCI of the target small cell is a PCI newly allocated to the target small cell when the target small cell transforms from an off state to an on state and is different from a PCI used in the off state.

According to another aspect of the disclosure, it is also provided a storage medium which includes machine-readable program codes which, when being executed on an information processing apparatus, cause the information processing apparatus to perform a method including: a grouping step of grouping PCIs according to values of the PCIs in a predetermined grouping manner; and a PCI allocation step of dynamically allocating, according to at least the grouping of the PCIs, a PCI to each small cell in a small cell cluster based on on/off state of each small cell in the small cell cluster. Preferably, a PCI of each small cell in the off state is different from a PCI the small cell in the on state.

According to another aspect of the disclosure, it is also provided a program product which includes machine-executable instructions which, when being executed on an information processing apparatus, cause the information processing apparatus to perform a method including: an access determination step of determining an access requirement of a user equipment; and a control step of transforming a target small cell from an off state to an on state and re-allocating a new PCI which is different from a PCI used in the off state to the target small cell, based on the access requirement of the user equipment.

According to another aspect of the disclosure, it is also provided a program product which includes machine-executable instructions which, when being executed on an information processing apparatus, cause the information processing apparatus to perform a method including: a judgment step of judging whether a user equipment needs to get access to a target small cell among neighboring small cells from a serving cell in which the device locates according to measurement results for discovery reference signals of the neighboring small cells by the user equipment, the user equipment being served by the serving cell; a transceiving step of transmitting an access request to the target small cell and receiving a response to the access request from the target small cell, in a case that it is judged that the user equipment needs to get access to the target small cell from the serving cell; and an instructing step of transmitting an instruction to the user equipment according to the response, such that the user equipment gets access to the target small cell according to a new PCI of the target small cell, where the instruction includes control information for getting access to the target small cell. Preferably, the new PCI of the target small cell is a PCI newly allocated to the target small cell when the target small cell transforms from an off state to an on state and is different from a PCI used in the off state.

According to another aspect of the disclosure, it is also provided a program product which includes machine-executable instructions which, when being executed on an information processing apparatus, cause the information processing apparatus to perform a method including: a transceiving step of transmitting measurement results for discovery reference signals of neighboring small cells by a user equipment to a serving cell and receiving from the serving cell an access instruction about getting access to a target small cell among the neighboring small cells, where the serving cell is a cell serving the user equipment currently; and a control step of acquiring a new PCI of the target small cell based on the access instruction, so as to control the user equipment to get access to the target small cell according to the new PCI. Preferably, the new PCI of the target small cell is a PCI newly allocated to the target small cell when the target small cell transforms from an off state to an on state and is different from a PCI used in the off state.

According to another aspect of the disclosure, it is also provided a program product which includes machine-executable instructions which, when being executed on an information processing apparatus, cause the information processing apparatus to perform a method including: a grouping step of grouping PCIs according to values of the PCIs in a predetermined grouping manner; and a PCI allocation step of dynamically allocating, according to at least the grouping of the PCIs, a PCI to each small cell in a small cell cluster based on on/off state of each small cell in the small cell cluster. Preferably, a PCI of each small cell in the off state is different from a PCI the small cell in the on state.

According to another aspect of the disclosure, it is also provided an electronic apparatus located in a wireless communication system and including circuitry which may be implemented as one or more processors and configured to perform a method including: an access determination step of determining an access requirement of a user equipment; and a control step of transforming a target small cell from an off state to an on state and re-allocating a new PCI which is different from a PCI used in the off state to the target small cell, based on the access requirement of the user equipment.

According to another aspect of the disclosure, it is also provided an electronic apparatus located in a wireless communication system and including circuitry which may be implemented as one or more processors and configured to perform a method including: a judgment step of judging whether a user equipment needs to get access to a target small cell among neighboring small cells from a serving cell in which the device locates according to measurement results for discovery reference signals of the neighboring small cells by the user equipment, the user equipment being served by the serving cell; a transceiving step of transmitting an access request to the target small cell and receiving a response to the access request from the target small cell, in a case that it is judged that the user equipment needs to get access to the target small cell from the serving cell; and an instructing step of transmitting an instruction to the user equipment according to the response, such that the user equipment gets access to the target small cell according to a new PCI of the target small cell, where the instruction includes control information for getting access to the target small cell. Preferably, the new PCI of the target small cell is a PCI newly allocated to the target small cell when the target small cell transforms from an off state to an on state and is different from a PCI used in the off state.

According to another aspect of the disclosure, it is also provided an electronic apparatus located in a wireless communication system and including circuitry which may be implemented as one or more processors and configured to perform a method including: a transceiving step of transmitting measurement results for discovery reference signals of neighboring small cells by a user equipment to a serving cell and receiving from the serving cell an access instruction about getting access to a target small cell among the neighboring small cells, where the serving cell is a cell serving the user equipment currently; and a control step of acquiring a new PCI of the target small cell based on the access instruction, so as to control the user equipment to get access to the target small cell according to the new PCI. Preferably, the new PCI of the target small cell is a PCI newly allocated to the target small cell when the target small cell transforms from an off state to an on state and is different from a PCI used in the off state.

According to another aspect of the disclosure, it is also provided an electronic apparatus located in a wireless communication system and including circuitry which may be implemented as one or more processors and configured to perform a method including: a grouping step of grouping PCIs according to values of the PCIs in a predetermined grouping manner; and a PCI allocation step of dynamically allocating, according to at least the grouping of the PCIs, a PCI to each small cell in a small cell cluster based on on/off state of each small cell in the small cell cluster. Preferably, a PCI of each small cell in the off state is different from a PCI the small cell in the on state.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE EMBODIMENTS

Figure 1:
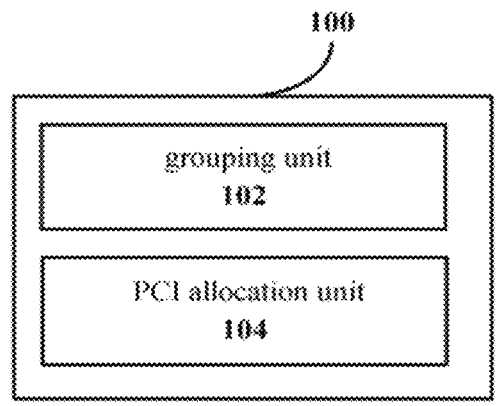
FIG. 1 is a block diagram illustrating a functional configuration example of a device in a wireless communication system according to an embodiment of the disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

In the following, preferred embodiments of the disclosure are described in detail with reference to FIGS. 1 to 19.

First, a functional configuration example of a device in a wireless communication system according to an embodiment of the disclosure is described with reference to FIG. 1. FIG. 1 is a block diagram illustrating a functional configuration example of a device in a wireless communication system according to an embodiment of the disclosure.

As shown in FIG. 1, the device 100 may include a grouping unit 102 and a PCI allocation unit 104.

The grouping unit 102 may be configured to group PCIs according to values of the PCIs in a predetermined grouping manner.

As a specific example, the predetermined grouping manner is selected from one of: (1) being based on a result of a PCI value mod 3 (PCI-mod-3); (2) being based on a result of a PCI value mod 6 (PCI-mod-6); and (3) being based on both a result of a PCI value mod 3 and a result of a PCI value mod 6.

An example of a grouping condition according to the grouping manner (3) is shown in the following Table 1, where all PCIs or PCIs for example used in a specific management region are grouped into 6 groups, and in each group, results of PCI values mod 3 and results of PCI values mod 6 have values as shown in Table 1. It should be understood by a person skilled in the art that the PCIs to be grouped may be also grouped into 3 groups according to the grouping manner (1), i.e., according to only results of PCI values mod 3. For example, PCIs, the values of which mod 3 are 0, 1, and 2, are grouped into three groups respectively. Further, the PCIs to be grouped may be also grouped into 6 PCI groups according to the grouping manner (2), i.e., according to only results of PCI values mod 6, which will not be described in the disclosure in detail.

TABLE 1

| PCI group | 1 | 2 | 3 | 4 | 5 | 6 |
|---|---|---|---|---|---|---|
| PCI-mod-3 value | 0 | 0 | 1 | 1 | 2 | 2 |
| PCI-mod-6 value | 0 | 3 | 1 | 4 | 2 | 5 |

The PCI allocation unit 104 may be configured to dynamically allocate, according to at least the grouping of the PCIs, a PCI to each small cell in a small cell cluster based on on/off state of each small cell in the small cell cluster, where a PCI of each small cell in the off state is different from a PCI of the small cell in the on state. In other words, the PCI allocation unit 104 reallocates a PCI to a small cell when an operation state of the small cell changes, for example, from the on state to the off state.

It is to be noted that the expression "on state" used in the disclosure is sometimes also referred to as activated state or operating state, and the expression "off state" is sometimes also referred to as deactivated state or sleep state. They are used synonymously herein. In the following description of the disclosure, expressions "on state" and "off state" are used for description. In addition, it should be understood that in this disclosure, the difference between the on state and the off state is that the small cell in the off state no longer provides data transmission services for user equipments.

Further, it is to be noted that when referring to variation in the operation state, it is generally directed to a small cell since when the inventor contemplated the idea of the disclosure, the variation in the operation state occurs in only the small cell. However, with the development of technology, in a wireless communication system in the future, if a macro cell may also change its operation state (i.e., transforming between the on state and the off state), or there is no need to specifically distinguish the macro cell and the small cell, the solution of the disclosure may be applicable to various cells in which PCIs to be allocated are limited, without being limited to only the small cell.

In an example of the disclosure, small cells in the off state may reuse limited PCIs loosely. Specifically, cells in the on state need to provide data transmission services for user equipments within coverage thereof and guarantee transmission quality, thus limitation on reuse of PCIs between cells in the on state is relatively strict, for example, neighboring cells, or cells which are not neighbors but share a common neighboring cell are prohibited from using a same PCI, to avoid problems such as conflictions, confusions, interferences or the like of synchronization signals and/or reference signals. However, in the present disclosure, small cells in the off state do not provide data transmission services for the user equipments, thus reuse of PCIs between small cells in a loosen manner does not cause severe influence. Further, in a modified example, transmission power for the synchronization signals/reference signals of a small cell in the off state may be flexibly adjusted to a smaller transmission power, thereby reducing confliction with other small cells in the off state. Therefore, multiple small cells in the off state may share a common PCI, thus for example, unique PCIs in a specific region occupied by these small cells when being in the on state may be released to be allocated by the PCI allocation unit 104 to other small cells which require the PCIs.

Preferably, the PCI allocation unit 104 may be further configured to: allocate, when a target small cell is in the off state, an in-cluster general PCI of a target small cell cluster in which the target small cell locates to the target small cell, and configure for the target small cell an in-cluster unique channel state indication reference signal (CSI-RS) and/or a discovery reference signal (DRS, referring to 3GPP, Draft Report of 3GPP TSG RAN WG1 #77 for detailed contents of DRS) including the in-cluster unique CSI-RS. The in-cluster general PCI is a PCI shared by all small cells in the off state within the small cell cluster. More preferably, the in-cluster general PCIs of different small cell clusters within a predetermined range are different from each other. Specifically, the small cell cluster may be obtained by determining small cells in a region as a cluster according to region division, by limiting number of cells in a cluster or an average inter-cell distance in a cluster, or the like, which will not be described in detail in the disclosure, to avoid obscuring the disclosure. Allocating different CSI-RSs/DRSs to the small cells using the general PCI as described above may facilitate discovery, identification, and measurement for the small cells in the off state. Since patterns of CSI-RSs and DRSs are also limited, the above manner in which different small cell clusters use different general PCIs may improve identification for the small cells in the off state, that is, different small cells are distinguished according to PCIs in conjunction with CSI-RSs/DRSs.

It should be understood that, the number of PCIs is limited (504 PCIs), and with the increase of the number of small cells, it needs to reuse the PCIs to ensure that the PCIs can be effectively allocated and no confliction and interference are caused between the small cells. In the following, allocation of in-cluster available PCI sets to small cell clusters according to a PCI reuse condition is described in conjunction with FIG. 2. Here, the in-cluster available PCI set is a set of in-cluster unique PCIs available when all the small cells within the small cell cluster are in the on state.

Figure 2:
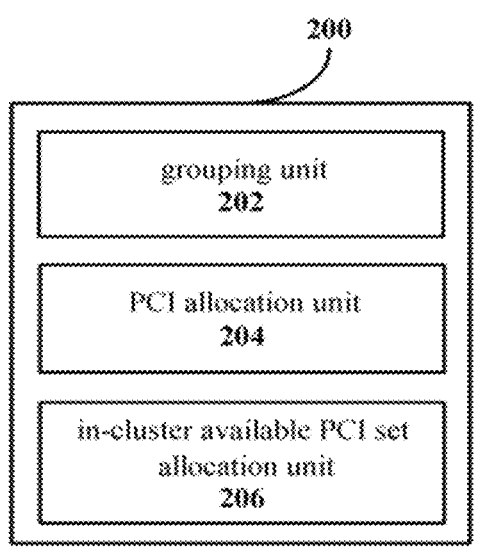
FIG. 2 is a block diagram illustrating another functional configuration example of a device in a wireless communication system according to an embodiment of the disclosure.

In the following, another functional configuration example of a device in a wireless communication system according to an embodiment of the disclosure is described with reference to FIG. 2. FIG. 2 is a block diagram illustrating another functional configuration example of a device in a wireless communication system according to an embodiment of the disclosure.

As shown in FIG. 2, a device 200 may include a grouping unit 202, a PCI allocation unit 204 and an in-cluster available PCI set allocation unit 206, where functional configurations of the grouping unit 202 and the PCI allocation unit 204 are the same as functional configurations of the grouping unit 102 and the PCI allocation unit 104 shown in FIG. 1, and are not described here. In the following, only the functional configuration example of the in-cluster available PCI set allocation unit 206 is described in detail.

The in-cluster available PCI set allocation unit 206 may be configured to allocate an in-cluster available PCI set to each small cell cluster according to a predetermined PCI reuse condition among small cell clusters and the number of small cells in the small cell cluster. The in-cluster available PCI set is a set of in-cluster unique PCIs available when all the small cells within the small cell cluster are in the on state, and there is no overlapping between the in-cluster available PCI sets of small cell clusters not satisfying the reuse condition.

Preferably, the PCI reuse condition among small cell clusters may be set based on one of: (1) cell searching capability of a user equipment on an edge of a small cell cluster; and (2) coverage of a macro cell and cell searching capability of a user equipment.

Figure 3:
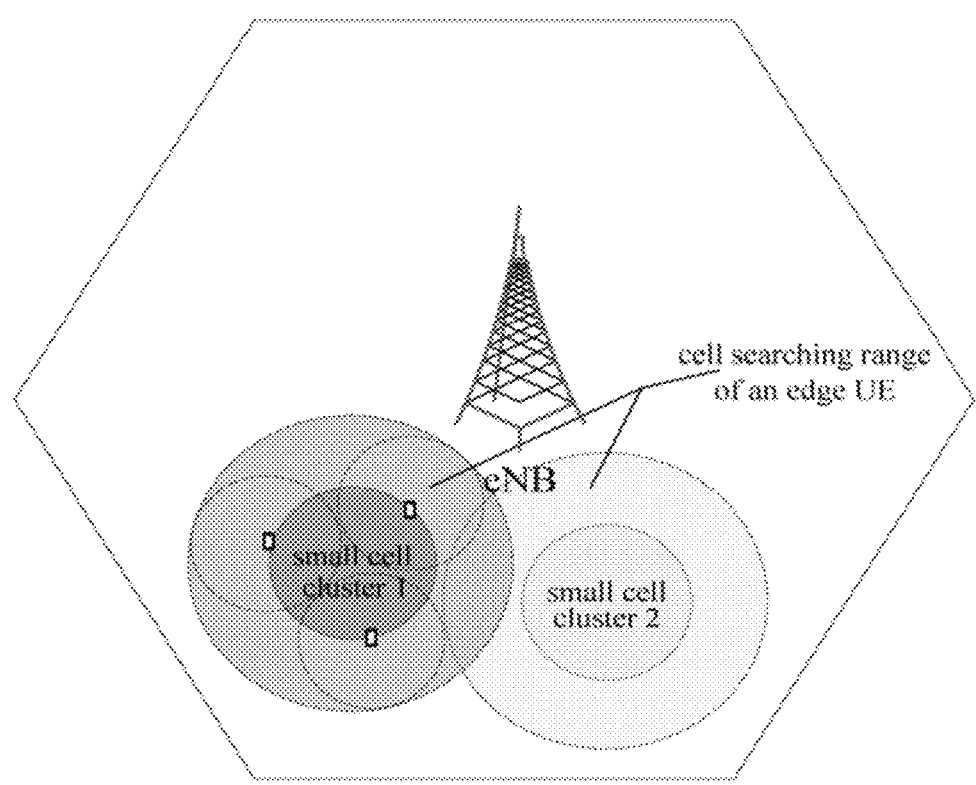
FIG. 3 is a schematic diagram illustrating an example of a PCI reuse condition among small cell clusters according to an embodiment of the disclosure.

FIG. 3 is a schematic diagram illustrating an example of a PCI reuse condition among small cell clusters according to an embodiment of the disclosure. In a case that the PCI reuse condition is set based on the searching capability of the user equipment on the edge of the small cell cluster, whether different small cell clusters can reuse PCIs may be determined based on cell searching ranges of user equipments on edges of the small cell clusters. As shown in FIG. 3, for example, since any one of a small cell cluster 1 and a small cell cluster 2 is out of the searching ranges of the user equipments on the edge of another one, even a small cell in the small cell cluster 1 and a small cell in the small cell cluster 2 which are closest to each other use a same PCI, user equipments in any one of these two small cells will not be interfered by user equipments in another one, the small cell cluster 1 and the small cell cluster 2 can reuse PCIs. In an example of the disclosure, the in-cluster available PCI set allocation unit 206 may be configured to determine searching capability of a specific user equipment on the edge of the small cell cluster according to the actual performance of the specific user equipment. In another example, the in-cluster available PCI set allocation unit 206 may be configured to estimate searching capability of a user equipment according to general performance or best performance of the user equipment.

Figure 4:
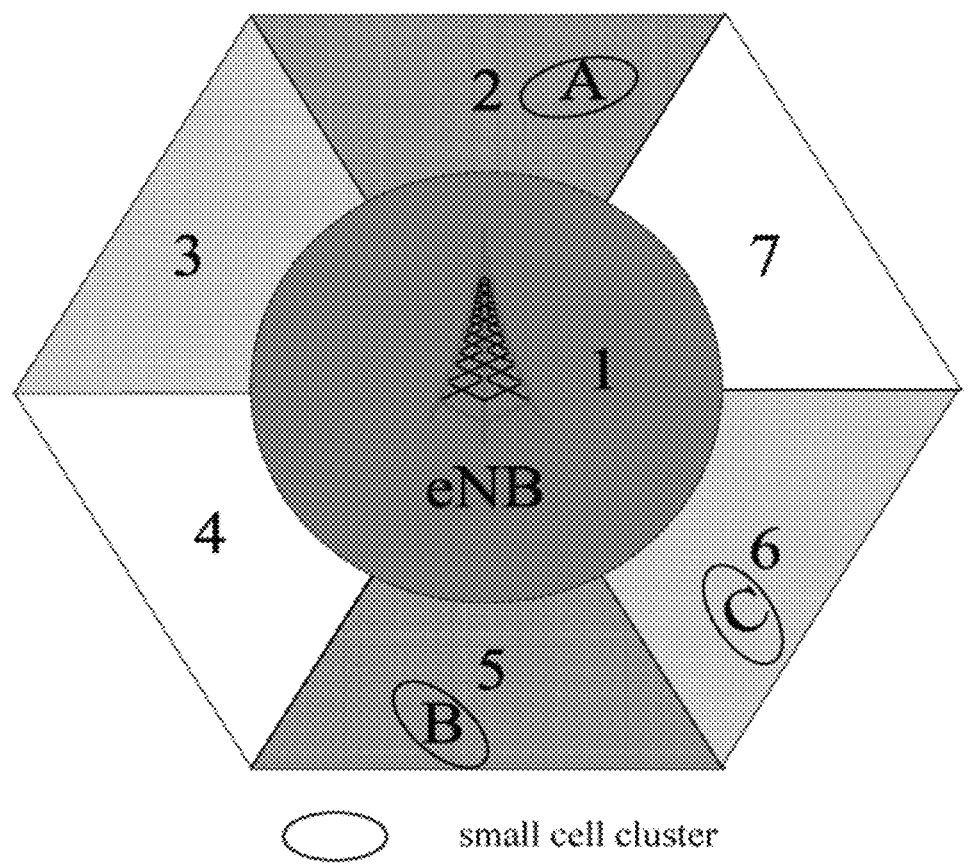
FIG. 4 is a schematic diagram illustrating another example of a PCI reuse condition among small cell clusters according to an embodiment of the disclosure.

FIG. 4 is a schematic diagram illustrating another example of a PCI reuse condition among small cell clusters according to an embodiment of the disclosure. As shown in FIG. 4, in a case that the PCI reuse condition is set based on partitions of a macro cell, the macro cell may be partitioned according to coverage of the macro cell and a maximal cell searching range of user equipments in a simplified manner. Small cell clusters in partitions which are farthest away from each other can reuse PCIs. A radius of a central partition and the number of partitions shown in FIG. 4 are adjustable. For example, as shown in FIG. 4, small cells in small cell cluster B can reuse the PCIs used in small cell cluster A, and the small cell cluster A and the small cell cluster B cannot reuse PCIs used in small cell cluster C. Specifically, small cell clusters that can reuse PCIs may be marked by colors, thus, for example, small cells in partitions with a same color can reuse PCIs.

In the following Table 2, by taking the above grouping manner (3) and the reuse condition (2) as examples, examples of in-cluster available PCI sets of the small cell cluster A, the small cell cluster B and the small cell cluster C shown in FIG. 4 are illustrated. As can be seen, there is no overlapping between the in-cluster available PCI sets of small cell clusters which do not satisfy the reuse condition.

TABLE 2

| PCI group | in-cluster available PCI set of cluster A | in-cluster available PCI set of cluster B | in-cluster available PCI set of cluster C | ... |
|---|---|---|---|---|
| 1 | 24, ... | 24, ... | 30, ... | ... |
| 2 | 21, ... | 21, ... | 27, ... | ... |
| 3 | 31, ... | 31, ... | 37, ... | ... |
| 4 | 34, ... | 34, ... | 40, ... | ... |
| 5 | 44, ... | 44, ... | 50, ... | ... |
| 6 | 65, ... | 65, ... | 71, ... | ... |

Preferably, in a case that a network condition within a small cell cluster or a predetermined region is changed, for example, in a case that a small cell cluster or a small cell is newly added or removed, it is needed to re-determine the in-cluster available PCI set and notify each small cell of the same.

The PCI allocation unit 24 may be further configured to determine, according to the in-cluster general PCI and the in-cluster available PCI set allocated to each small cell cluster, a PCI of each of small cells within the small cell cluster based on the on/off state of the small cells.

Specifically, the PCI allocation unit 204 may be further configured to: when the small cell transforms from the on state to the off state, set the PCI of the small cell as the in-cluster general PCI and configure for each of a set of small cells in the off state an unique channel state indication reference signal (CSI-RS) in order to support cell identification and measurement mechanism for the small cells in the off state, as shown in the following Table 3.

TABLE 3

| Cells in the off state | Location | PCI | CSI-RS configuration |
|---|---|---|---|
| Cell 1 | | General PCI | CSI-RS 0 |
| Cell 2 | | General PCI | CSI-RS 1 |
| . | | General PCI | . |
| . | | | . |
| Cell N | | General PCI | CSI-RS N |

When the small cell transforms from the off state to the on state, the PCI allocation unit 204 may select a suitable in-cluster unique PCI for the small cell from the in-cluster available PCI set of the small cell cluster according to a current network condition (for example, the number, states, locations and PCI allocation conditions of small cells in the small cell cluster).

Specifically, the PCI allocation unit 204 is further configured to determine, for the target small cell to be turned on, a group to which the PCI of the target small cell belongs based on a predetermined grouping manner, locations of small cells in the on state within the target small cell cluster or a predetermined region and a current PCI allocation state within the target small cell cluster or the predetermined region, and randomly select an available PCI from the in-cluster available PCI set of the target small cell cluster according to the group to be allocated to the target small cell.

Figure 5:
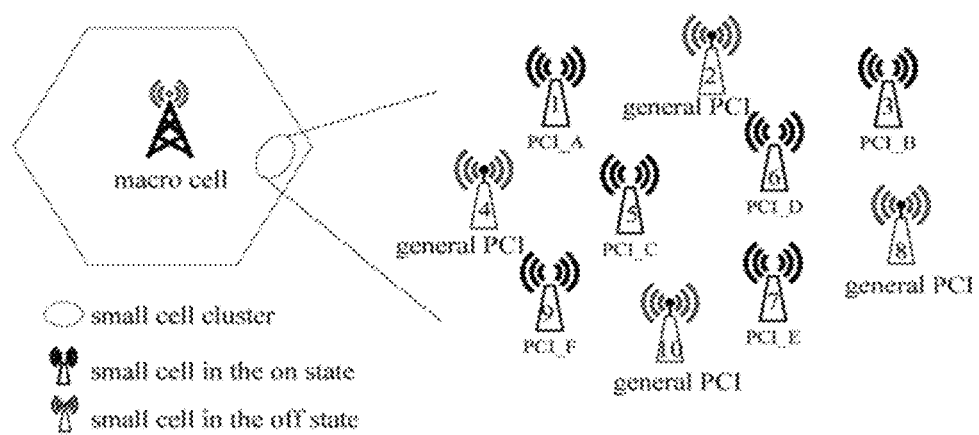
FIG. 5 is a schematic diagram illustrating an allocation state of PCIs of small cells within a small cell cluster according to an embodiment of the disclosure.

FIG. 5 is a schematic diagram illustrating an allocation state of PCIs of small cells within a small cell cluster according to an embodiment of the disclosure. As shown in FIG. 5, the PCIs of the small cells in the off state are the in-cluster general PCI of the small cell cluster, and in-cluster unique PCIs are allocated to small cells in the on state.

Figure 6:
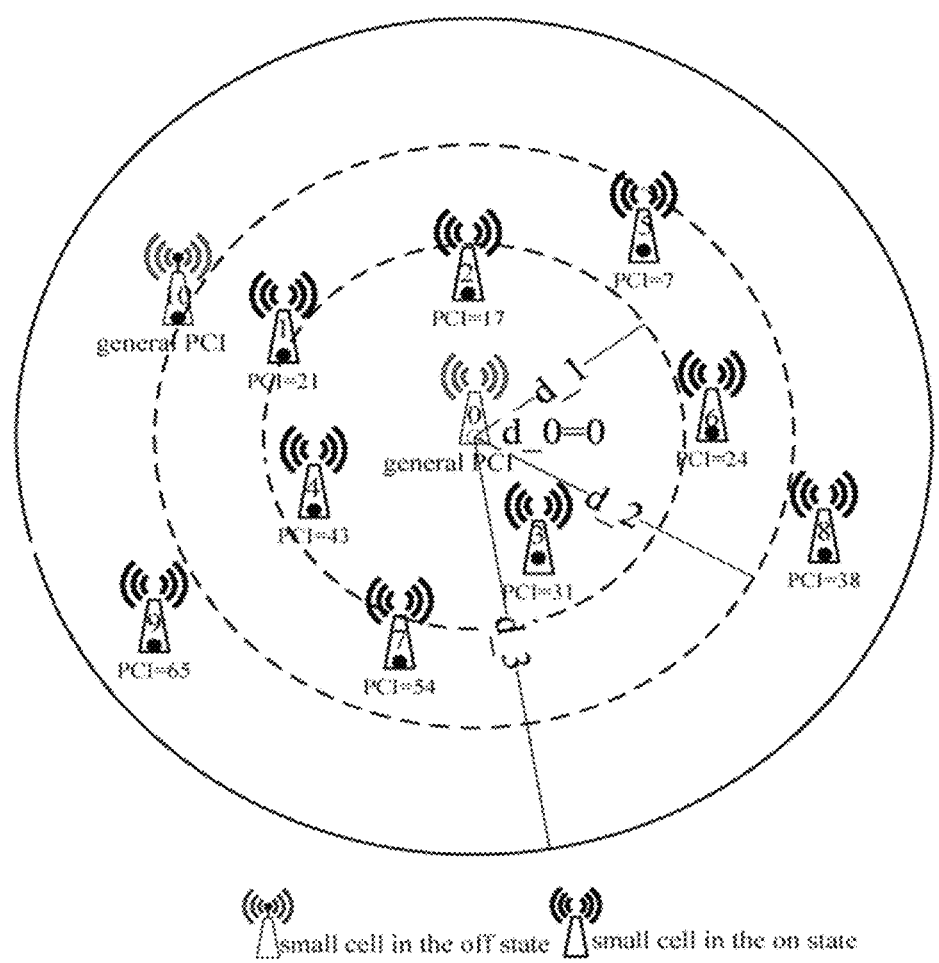
FIG. 6 is a schematic diagram illustrating an allocation state of PCIs of small cells within a small cell cluster according to an embodiment of the disclosure.

In the following, it is described in detail with reference to FIG. 6 how the PCI allocation unit 204 allocates an in-cluster unique PCI to a target small cell when the target small cell transforms from the off state to the on state. FIG. 6 is a schematic diagram illustrating an allocation state of PCIs of small cells within a small cell cluster according to an embodiment of the disclosure.

According to FIG. 6, the PCI allocation condition for small cells being in the on state currently in the target small cell cluster is shown in the following Table 4.

TABLE 4

| Cells in the on state | Location | PCI | CSI-RS configuration |
|---|---|---|---|
| Cell 1 | (x_1, y_1) | 21 | |
| Cell 2 | (x_2, y_2) | 17 | |
| Cell 3 | (x_3, y_3) | 31 | |
| Cell 4 | (x_4, y_4) | 43 | |
| Cell 5 | (x_5, y_5) | 7 | |
| Cell 6 | (x_6, y_6) | 24 | |
| Cell 7 | (x_7, y_7) | 54 | |
| Cell 8 | (x_8, y_8) | 38 | |
| Cell 9 | (x_9, y_9) | 65 | |

As an example, in the following, an allocation manner of the in-cluster unique PCI for a small cell 0 as the target small cell as shown in FIG. 6 when the small cell 0 transforms from the off state to the on state is described.

A First Example Manner

Preferably, the PCI allocating allocation unit 204 may be configured to determine, in a case that the predetermined grouping manner is being based on a result of a PCI value mod 3, when the target small cell transforms from the off state to the on state, the in-cluster unique PCI of the target small cell in such a manner that confliction between primary synchronization signals of the target small cell and small cells in the on state within a target small cell cluster in which the target small cell locates or within a predetermined region is minimized.

Specifically, as an example, a group to which the in-cluster unique PCI of the small cell 0 to be turned on belongs may be determined through the following steps.

In step 1A, a distance R from each of the small cells in the on state in the small cell cluster in which the small cell 0 locates or the predetermined region to the small cell 0 is calculated.

In step 2A, values of n, d_0, d_1, ..., d_n are configured, where i=0, n indicates the number of partitioned regions within the small cell cluster or the predetermined region (in the example shown in FIG. 6, n indicates the number of partitioned circular regions and equals to 3 in this example), d_i indicates a radius of a circular region centered at the small cell 0. It should be understood that values of n, d_0, d_1, ..., d_n may be predetermined empirical values or may be set according to a specific network condition. In addition, values of d_0, d_1, ..., d_n may be the same or different.

In step 3A, for small cells in the on state within the distance R (d_i≤R<d_i+1), results of PCI-mod-3 are calculated, and the number of the small cells are counted.

In step 4A, if there is a unique minimum value among the counting values, the small cell 0 is mapped to a PCI group corresponding to the unique minimum value; if there is no unique minimum value and i=n−1, the small cell 0 is mapped to a PCI group corresponding to any one of the rest of the values; and if there is no unique minimum value and i≠n−1, the procedure proceeds to the following step 5A.

In step 5A, PCI groups corresponding to non-minimum values are excluded, i is incremented by one, and the procedure returns to step 3A.

Taking the scenario shown in FIG. 6 as an example, a statistical result is shown in the following Table 5.

TABLE 5

| PCI_mod_3 value | d_0 ≤ R < d_1 | d_1 ≤ R < d_2 | d_2 ≤ R < d_3 |
|---|---|---|---|
| | | the number of small cell | |
| 0 | 1 | 2 | x |
| 1 | 2 | x | x |
| 2 | 1 | 1 | x |

As can be seen, in the example shown in Table 5, the small cell 0 is mapped to the group for which the PCI-mod-3 value is 2, to avoid confliction between PSSs of the small cell 0 and other small cells as much as possible.

It is to be noted here that the symbol "x" in the above Table 5 indicates a value which is not counted. This is because it is unnecessary to take small cells in these regions into consideration according to the forgoing processing steps, thereby simplifying calculation steps. Of course, all of data in this small cell cluster or the predetermined region may be calculated in advance. This also applies for the following example.

It is to be understood that the above processing steps are illustrative only but not limitation, and a person skilled in the art will be able to conceive of other specific allocation manners according to the principle of the disclosure, as long as the confliction between PSSs can be avoided as much as possible.

A Second Example Manner

Alternatively, the PCI allocation unit 204 may be further configured to determine, in a case that the predetermined grouping manner is being based on a result of a PCI value mod 6, when a target small cell transforms from the off state to the on state, an in-cluster unique PCI of the target small cell in such a manner that confliction between cell-specific frequency offsets of the target small cell and small cells in the on state within a target small cell cluster in which the target small cell locates or within a predetermined region is minimized.

Specifically, as an example, a group to which the in-cluster unique PCI of the small cell 0 to be turned on belongs may be determined through the following steps.

In step 1B, a distance R from each of the small cells in the on state in the small cell cluster in which the small cell 0 locates or within the predetermined region to the small cell 0 is calculated.

In step 2B, values of n, d_0, d_1, ..., d_n are configured, where i=0, n indicates the number of partitioned regions in the small cell cluster or the predetermined region (in the example shown in FIG. 6, n indicates the number of partitioned circular regions and equals to 3 in this example), d_i indicates a radius of a circular region centered at the small cell 0. It should be understood that values of n, d_0, d_1, ..., d_n may be predetermined empirical values or may be set according to a specific network condition. In addition, values of d_0, d_1, ..., d_n may be the same or different.

In step 3B, for small cells in the on state within the distance R (d_i≤R<d_i+1), results of PCI-mod-6 are calculated, and the number of the small cells are counted.

In step 4B, if there is a unique minimum value among the counting values, the small cell 0 is mapped to a PCI group corresponding to the unique minimum value; if there is no unique minimum value and i=n−1, the small cell 0 is mapped to a PCI group corresponding to any one of the rest of the values; and if there is no unique minimum value and i≠n−1, the procedure proceeds to the following step 5B.

In step 5B, PCI groups corresponding to non-minimum values are excluded, i is incremented by one, and the procedure returns to step 3B.

A statistical result is shown in the following Table 6 for example.

TABLE 6

| PCI_mod_3 value | d_0 ≤ R < d_1 | d_1 ≤ R < d_2 | d_2 ≤ R < d_3 |
|---|---|---|---|
| | | the number of small cell | |
| 0 | 0 | 2 | x |
| 1 | 2 | x | x |
| 2 | 0 | 0 | 1 |
| 3 | 1 | x | x |
| 4 | 0 | 0 | 0 |
| 5 | 1 | x | x |

As can be seen, in the example shown in Table 6, the small cell 0 is mapped to the group for which the result of PCI_mod_6 is 4, to avoid the confliction between cell-specific frequency offsets of the small cell 0 and other small cells as much as possible.

It is to be understood that the above processing steps are illustrative only but not limitation, and a person skilled in the art will be able to conceive of other allocation manners according to the principle of the disclosure, as long as the confliction between cell-specific frequency offsets can be avoided as much as possible.

A Third Example Manner

Alternatively, the PCI allocation unit 204 may be further configured to determine, in a case that the grouping manner is being based on both a result of a PCI value mod 3 and a result of a PCI value mod 6, when a target small cell transforms from the off state to the on state, an in-cluster unique PCI of the target small cell in such a manner that confliction between primary synchronization signals and confliction between cell-specific frequency offsets of the target small cell and small cells in the on state within a target small cell cluster in which the target small cell locates or within a predetermined region are minimized.

Specifically, as an example, a group to which the in-cluster unique PCI of the small cell 0 to be turned on belongs may be determined through the following steps.

In step 1C, a distance R from each of the small cells in the on state in the small cell cluster in which the small cell 0 locates or the predetermined region to the small cell 0 is calculated.

In step 2C, values of n, d_0, d_1, . . . , d_n are configured, where i=0, j=0, n indicates the number of partitioned regions in the small cell cluster or the predetermined region (in the example shown in FIG. 6, n indicates the number of partitioned circular regions and equals to 3 in this example), d_i indicates a radius of a circular region centered at the small cell 0. It is to be understood that values of n, d_0, d_1, . . . , d_n may be predetermined empirical values or may be set according to a specific network condition. In addition, values of d_0, d_1, . . . , d_n may be the same or different.

In step 3C, for small cells in the on state within the distance R (d_i≤R<d_i+1), results of PCI-mod-3 are calculated, and the number of the small cells are counted.

In step 4C, if there is a unique maximum value among the counting values, the PCI group corresponding to the unique maximum value is excluded. If i=0, step 7C is executed; and if i≥1, step 5C is executed.

In step 5C, the numbers of small cells based on results of PCI-mod-6 within the distance R (d_j≤R<d_j+1) are counted and compared with each other, if there is a unique minimum value among the counting values, the small cell is mapped to the PCI group corresponding to the unique minimum value. If there is no unique minimum value, the procedure proceeds to the following step 6C.

In step 6C, if j=i−1, the procedure proceeds to the following step 7C; and if j<i−1, j is incremented by one, and the procedure returns to step 5C.

In step 7C, for small cells in the on state within the distance R (d_i≤R<d_i+1), results of PCI-mod-6 are calculated, and the number of the small cells are counted.

In step 8C, if there is a unique minimum value among the counting values, the small cell 0 is mapped to a PCI group corresponding to the unique minimum value; if there is no unique minimum value and i=n−1, the small cell 0 is mapped to a PCI group corresponding to any one of the rest of the values; and if there is no unique minimum value and i≠n−1, the procedure proceeds to the following step 9C.

In step 9C, if there is a unique maximum value among the counting values, the PCI group corresponding to the unique maximum value is excluded, i is incremented by one, j is cleared to 0, and the procedure returns to step 3C.

As an example, a statistical result is shown in the following Table 7.

TABLE 7

| PCI_mod_3 value | distance | | | PCI_mod_6 value | distance | | |
| | d_0 ≤ R < d_1 | d_1 ≤ R < d_2 | d_2 ≤ R < d_3 | | d_0 ≤ R < d_1 | d_1 ≤ R < d_2 | d_2 ≤ R < d_3 |
| | the number of small cells | | | | the number of small cells | | |
| 0 | 1 | 2 | x | 0 | 0 | x | x |
| | | | | 3 | 1 | x | x |
| 1 | 2 | x | x | 1 | x | x | x |
| | | | | 4 | x | x | x |
| 2 | 1 | 1 | x | 2 | 0 | x | x |
| | | | | 5 | 1 | x | x |

As can be seen, in the example shown in Table 7, the small cell 0 is mapped to the group for which the result of PCI_mod_6 is 2.

Alternatively, in the above examples, the group to which the PCI of the small cell 0 belongs is determined on the condition that avoiding PSS confliction takes precedence over avoiding cell-specific frequency offset confliction. However, the group to which the PCI of the small cell 0 belongs also can be determined on the condition that avoiding cell-specific frequency offset confliction takes precedence over avoiding PSS confliction. The specific procedure includes the following step 1D to 9D.

In step 1D, a distance R from each of the small cells in the on state in the small cell cluster in which the small cell 0 locates or the predetermined region to the small cell 0 is calculated.

In step 2D, values of n, d_0, d_1, . . . , d_n are configured, where i=0, j=0, n indicates the number of partitioned regions in the small cell cluster or the predetermined region (in the example shown in FIG. 6, n indicates the number of partitioned circular regions and equals to 3 in this example), d_i indicates a radius of a circular region centered at the small cell 0. It is to be understood that values of n, d_0, d_1, . . . , d_n may be predetermined empirical values or may be set according to a specific network condition. In addition, values of d_0, d_1, . . . , d_n may be the same or different.

In step 3D, for small cells in the on state within the distance R (d_i≤R<d_i+1), results of PCI-mod-6 are calculated, and the number of the small cells are counted.

In step 4D, if there is a unique maximum value among the counting values, the PCI group corresponding to the unique maximum value is excluded. If i=0, step 7D is executed; and if i≥1, step 5D is executed.

In step 5D, the numbers of small cells based on results of PCI-mod-3 within the distance R (d_j≤R<d_j+1) are counted and compared with each other, if there is a unique minimum value among the counting values, the small cell 0 is mapped to the PCI group corresponding to the unique minimum value. If there is no unique minimum value, the procedure proceeds to the following step 6D.

In step 6D, if j=i−1, the procedure proceeds to the following step 7D; and if j<i−1, j is incremented by one, and the procedure returns to step 5D.

In step 7D, for small cells in the on state within the distance R (d_i≤R<d_i+1), results of PCI-mod-3 are calculated, and the number of the small cells are counted.

In step 8D, if there is a unique minimum value among the counting values, the small cell 0 is mapped to a PCI group corresponding to the unique minimum value; if there is no unique minimum value and i=n−1, the small cell 0 is mapped to a PCI group corresponding to any one of the rest of the values; and if there is no unique minimum value and i≠n−1, the procedure proceeds to the following step 9D.

In step 9D, if there is a unique maximum value among the counting values, the PCI group corresponding to the unique maximum value is excluded, i is incremented by one, j is cleared to 0, and the procedure returns to step 3D.

It should be understood that the above processing steps are illustrative only but not limitation, and a person skilled in the art will be able to conceive of other allocation manners according to the principle of the disclosure, as long as the PSS confliction and the cell-specific frequency offset confliction can be avoided as much as possible.

After the PCI group to which the PCI of the target small cell to be turned on belongs is determined in any one of the above manners, an available PCI belonging to the PCI group can be randomly selected from the in-cluster available PCI set of the small cell cluster and allocated to the target small cell.

In addition, preferably, for a scenario where a small cell rapidly transforms between the on state and the off state, the following rapid allocation method can be adopted in order to simplify PCI allocation for small cells. The method includes configuring a PCI of a small cell to be mapped to a specific group when deploying the small cell, and directly allocating an available PCI in the specific group to the small cell when the small cell transforms from the off state to the on state.

Figure 7:
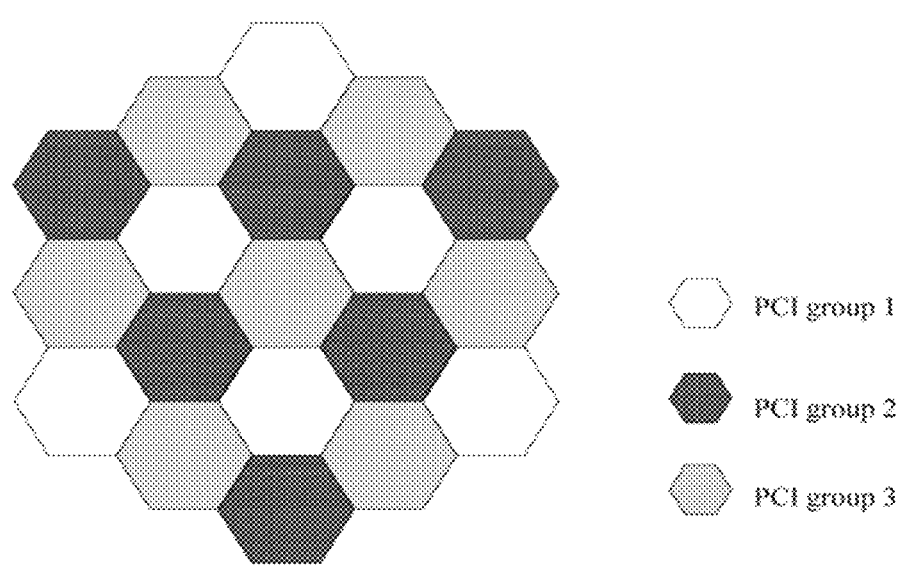
FIG. 7 is a schematic diagram illustrating an example of PCI group mapping of small cells within a small cell cluster according to an embodiment of the disclosure.
Figure 8:
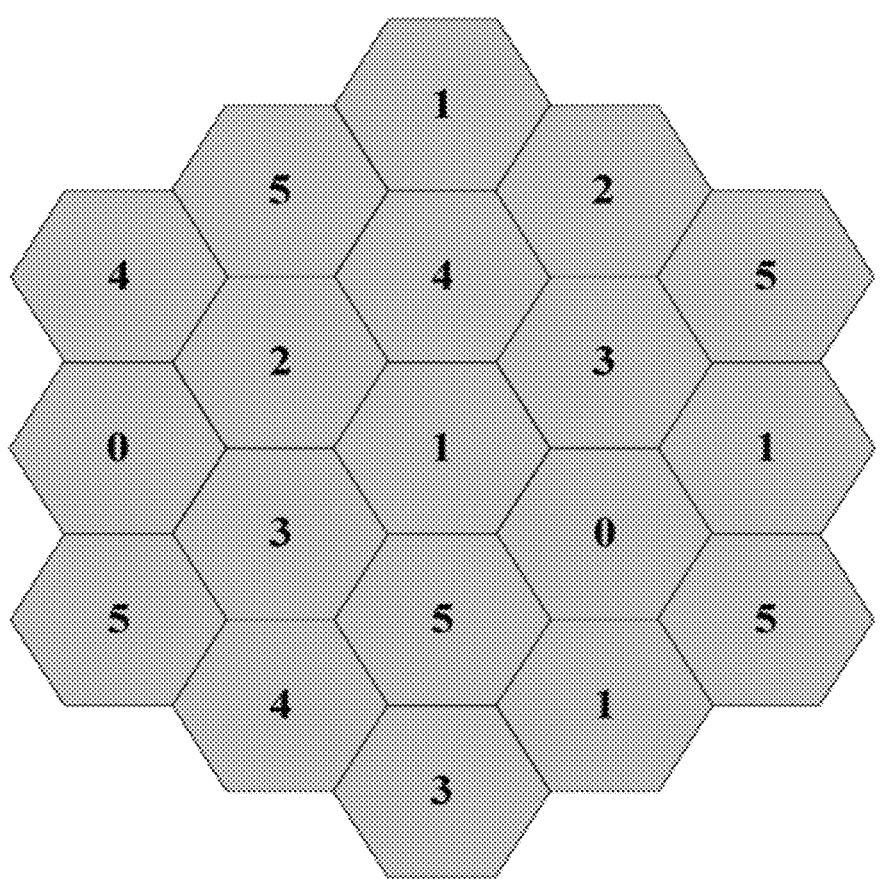
FIG. 8 is a schematic diagram illustrating another example of PCI group mapping of small cells within a small cell cluster according to an embodiment of the disclosure.
Figure 9:
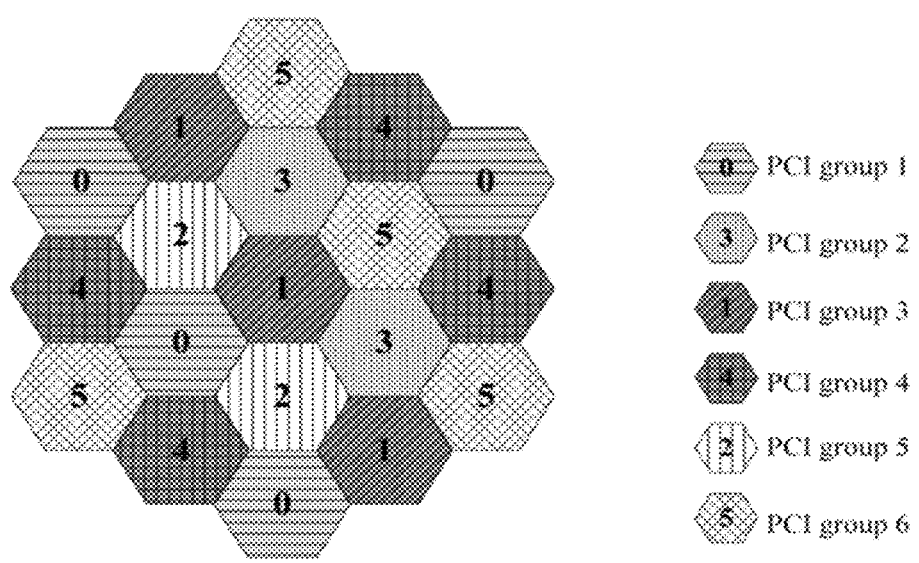
FIG. 9 is a schematic diagram illustrating another example of PCI group mapping of small cells within a small cell cluster according to an embodiment of the disclosure.

Particularly, the PCI allocation unit 204 may be further configured to determine a group to which a PCI of each small cell belongs in such a manner that PCIs of neighboring small cells are mapped to different groups, and to select, when the target small cell transforms from the off state to the on state, an available PCI from the group to which the PCI of the target small cell belongs to be allocated to the target small cell as an in-cluster unique PCI. FIGS. 7 to 9 illustrate ideal effects of PCI group mapping in different cases based on the rapid allocation method.

FIG. 7 is a schematic diagram illustrating an example of PCI group mapping of small cells within a small cell cluster according to an embodiment of the disclosure. In the example shown in FIG. 7, PCIs are grouped into 3 groups according to the results of PCI-mod-3, and neighboring small cells are mapped to different PCI groups in order to avoid PSS confliction as much as possible.

FIG. 8 is a schematic diagram illustrating another example of PCI group mapping of small cells within a small cell cluster according to an embodiment of the disclosure. In the example shown in FIG. 8, PCIs are grouped into 6 groups according to the results of PCI-mod-6, and neighboring small cells are mapped to different PCI groups in order to avoid cell-specific frequency offset confliction as much as possible.

FIG. 9 is a schematic diagram illustrating another example of PCI group mapping of small cells within a small cell cluster according to an embodiment of the disclosure. In the example shown in FIG. 9, PCIs are grouped into 6 groups according to results of PCI-mod-3 and results of PCI-mod-6, and neighboring small cells are mapped to different PCI groups in order to avoid PSS confliction and cell-specific frequency offset confliction as much as possible.

In addition, preferably, the PCI allocation unit 204 may be further configured to allocate a same PCI group to two neighboring small cells or allocate a same PCI to the two neighboring small cells when the two neighboring small cells are each in the on state, in a case that the two neighboring small cells are periodically turned on/off and on time periods of the two neighboring small cells do not overlap.

Preferably, the in-cluster available PCI set allocation unit 206 may be further configured to dynamically manage the in-cluster available PCI set of the small cell cluster according to on/off states of small cells in the small cell cluster. Specifically, the in-cluster available PCI set allocation unit 206 may delete the PCI allocated to the target small cell from the in-cluster available PCI set of the target small cell cluster when the target small cell is in the on state, and to add the PCI used by the target small cell before being turned off to the in-cluster available PCI set of the target small cell cluster when the target small cell is in the off state since the PCI of the target small cell is set to the in-cluster general PCI at this time.

According to the above embodiment, PCI allocation in the small cell cluster can be dynamically managed according to on/off states of small cells, thereby reducing maintenance cost and burden on cell planning and improving flexibility.

In the following, a cell searching and accessing procedure in a case that PCIs are dynamically allocated is described with reference to FIGS. 10 and 11. It is to be noted that in the examples shown in FIGS. 10 and 11 of the disclosure, by taking a handover flow as an example, influence on the flow caused by PCI variations before and after turning on and off of the small cell and a corresponding improved solution are described. However, a person skilled in the art may appreciate based on the spirit of the disclosure that in PCI-related operations such as cell synchronization, channel estimation, control channel decoding or the like, a base station should transmit information regarding PCI variation of a cell corresponding to a specific GCT (global cell ID) to the user equipment, for example, by means of RRC signaling.

Figure 10:
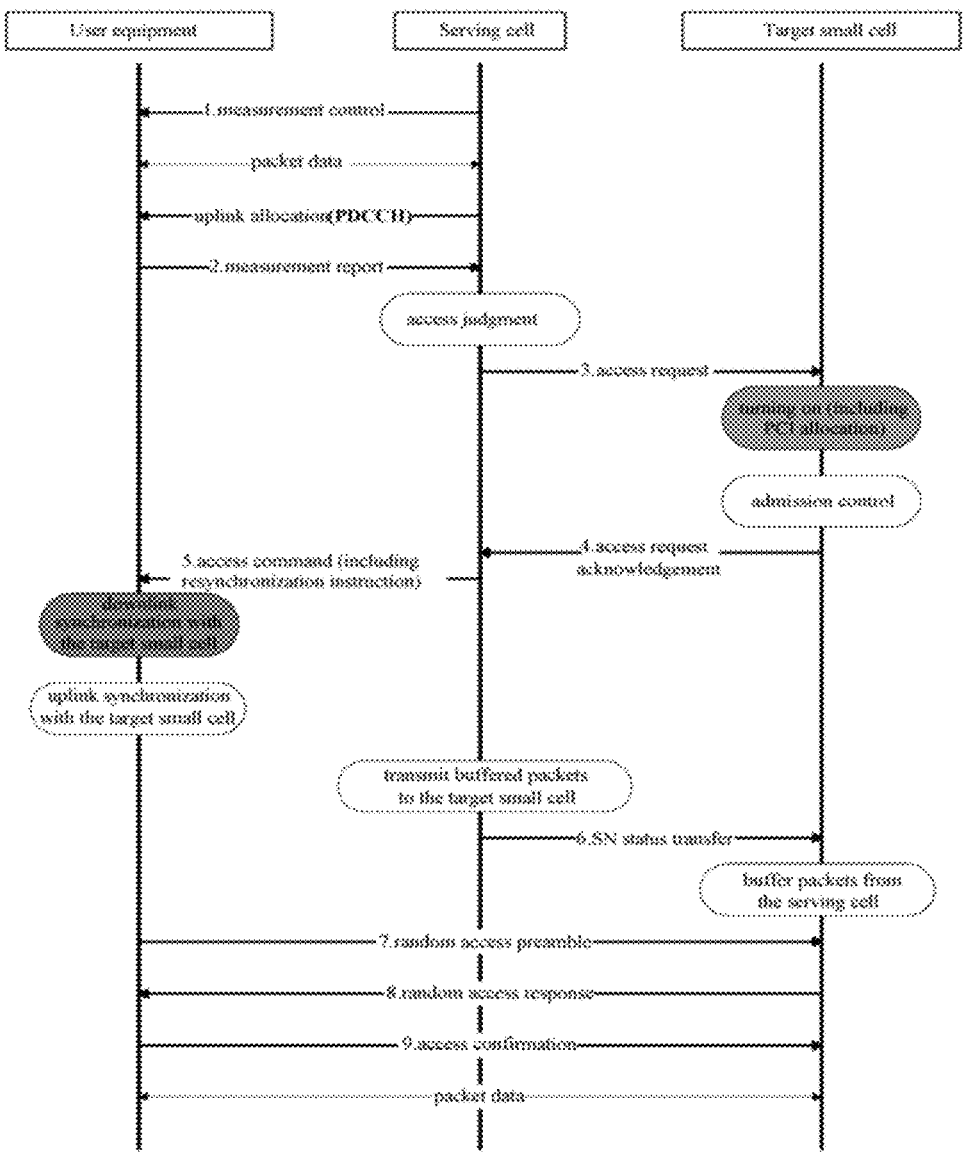
FIG. 10 is a schematic diagram illustrating a signaling interaction flow for cell searching and accessing in a case that PCIs are dynamically allocated according to an embodiment of the disclosure.
Figure 11:
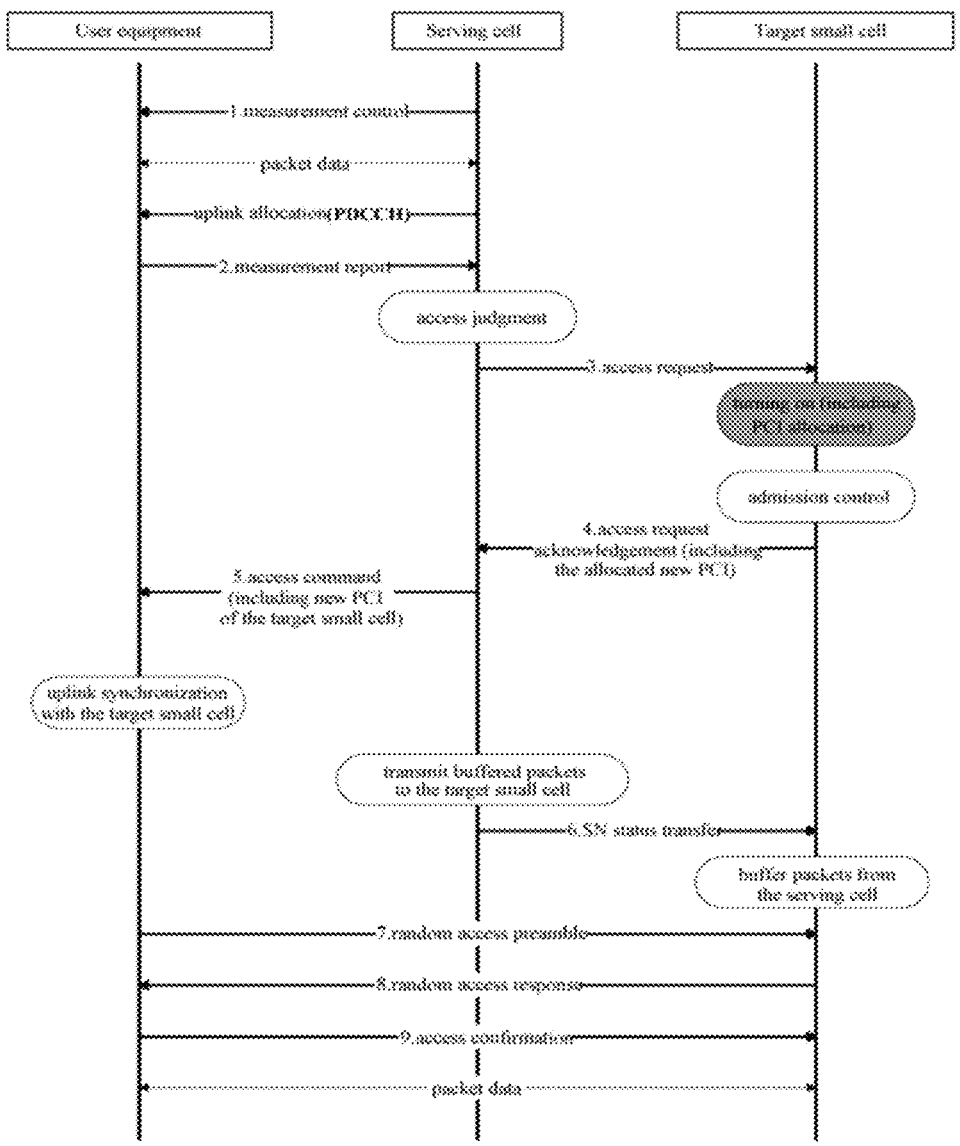
FIG. 11 is a schematic diagram illustrating another signaling interaction flow for cell searching and accessing in a case that PCIs are dynamically allocated according to an embodiment of the disclosure.

FIG. 10 is a schematic diagram illustrating a signaling interaction flow for cell searching and accessing in a case that PCIs are dynamically allocated according to an embodiment of the disclosure, and FIG. 11 is a schematic diagram illustrating another signaling interaction flow for cell searching and accessing in a case that PCIs are dynamically allocated according to an embodiment of the disclosure.

It is to be noted that, (mobility) signaling interaction flows for cell searching and accessing as shown in FIGS. 10 and 11 are different from the conventional technology in that since the target small cell uses different PCIs when being in the on state and the off state, it needs to notify the variation in PCI to the user equipment, so that the user equipment can obtain the PCI of the target small cell in the on state before accessing to the target small cell. This difference is shown in shadowed blocks in FIGS. 10 and 11.

In FIGS. 10 and 11, the serving cell is the cell currently serving the user equipment, and may be a macro cell or a small cell. The target small cell is a small cell to which the user equipment is to get access. In the following, the specific signaling interaction flow is described in detail with reference to FIG. 10 and FIG. 11 respectively.

As shown in FIG. 10, first, as an example, the serving cell notifies the user equipment which needs to perform the cell searching current PCIs of neighboring small cells, time instants at which the neighboring small cells transmit cell discovery reference signals (DRSs) and configurations of the DRSs, or CST-RS configuration information of the neighboring small cells (which are included in the "measurement control" shown in FIG. 10). After synchronizing with the neighboring small cells according to the PCIs of the neighboring small cells and performing measurement based on the specific CSI-RSs/DRSs of the neighboring small cells, the user equipment reports the measurement results to the serving cell (corresponding to "measurement report" shown in FIG. 10). The serving cell determines whether the UE needs to get access to the target small cell among the neighboring small cells according to the measurement results of cell searching received from the user equipment (corresponding to "access judgment" shown in FIG. 10), and transmit an access request to the target small cell in a case of determining that the user equipment needs to get access to the target small cell (corresponding to "access request" shown in FIG. 10).

Upon reception of the access request, the target small cell transforms from the off state to the on state, and changes its PCI from the in-cluster general PCI to the in-cluster unique PCI (corresponding to the shadowed block "turning on" shown in FIG. 10). It should be understood that the in-cluster unique PCI can be determined for example in the manners described in the above embodiments. The in-cluster unique PCI is selected from the in-cluster available PCI set of the small cell cluster, and is different from the in-cluster general PCI used by the target small cell in the off state.

Next, the target small cell responds to the access request to notify the serving cell the variation of its PCI (corresponding to "access request acknowledgement" shown in FIG. 10).

Upon reception of the notification from the target small cell, the serving cell transmits an instruction to the user equipment (corresponding to "access command" shown in FIG. 10). It should be understood that in this example, the notification does not include the PCI of the target small cell in the on state, thus, the "access command" includes an instruction for instructing the user equipment to perform downlink resynchronization with the target small cell, such that the user equipment obtains from the target small cell the PCI thereof in the on state.

Upon reception of the instruction from the serving cell, the user equipment performs downlink resynchronization with the target small cell (corresponding to the shadowed block "downlink synchronization with the target small" shown in FIG. 10), in order to obtain the PCI of the target small cell in the on state.

The signaling interaction procedure after the PCI of the target small cell in the on state is obtained is similar as the conventional technology, and is omitted herein.

It is to be noted that although the access request is from the serving cell in the example shown in FIG. 10, the present disclosure is not limited thereto. For example, in a C-RAN architecture, the access request can be determined and notified to the target small cell by a baseband cloud.

The signaling interaction flow shown in FIG. 11 is similar as the signaling interaction flow shown in FIG. 10 except that the "access request acknowledgement" from the target small cell includes the PCI of the target small cell in the on state, such that the user equipment can directly obtain the PCI of the target small cell in the on state from the "access command" from the serving cell, without performing downlink resynchronization with the target small cell. The rest of the signaling interaction flow can be referred to the description made with reference to FIG. 10, and is not repeated here.

In the following, functional configuration examples of the target small cell side, the serving cell side and the user equipment side in the case that PCIs are allocated dynamically are described with reference to FIGS. 12 to 14 and in conjunction with the signaling interaction flows described with reference to FIGS. 10 and 11.

Figure 12:
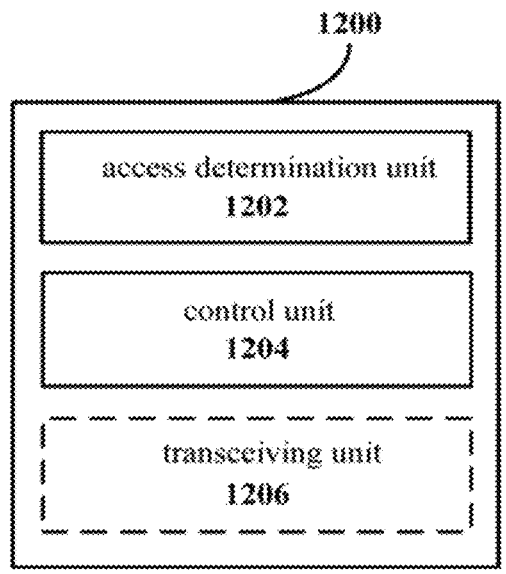
FIG. 12 is a block diagram illustrating a functional configuration example of a device in a wireless communication system according to an embodiment of the disclosure.

FIG. 12 is a block diagram illustrating a functional configuration example of a device in a wireless communication system according to an embodiment of the disclosure. The device is located on the side of the target small cell.

As shown in FIG. 12, a device 1200 may include an access determination unit 1202 and a control unit 1204.

The access determination unit 1202 may be configured to determine an access requirement of a user equipment. It should be understood that the access requirement may include but is not limited to for example a handover requirement, a dual-connection requirement, a cross-site carrier aggregation requirement or the like.

The control unit 1204 may be configured to transform, based on the access requirement of the user equipment, a target small cell in which the device 1200 locates from an off state to an on state and re-allocate a new PCI which is different from a PCI used in the off state to the target small cell.

Preferably, when the target small cell is in the off state, the PCI of the target small cell is an in-cluster general PCI shared by multiple small cells in an off state within a small cell cluster in which the target small cell locates, and in-cluster general PCIs of different small cell clusters within a predetermined range are different from each other. When the target small cell is in the on state, the PCI of the target small cell is an in-cluster unique PCI selected from an in-cluster available PCI set of the small cell cluster in which the target small cell locates, the in-cluster available PCI set being a set of in-cluster unique PCIs available when all small cells within the small cell cluster are in the on state. For example, the control unit 1204 may allocate the in-cluster unique PCIs used in the on state in the manners described in the above embodiments.

It should be understood that the in-cluster general PCI and the in-cluster available PCI set described herein may be stored in the device 1200 in advance, may be received from an external device, or may be determined by the device 1200 itself in the manners described in the above embodiments for example.

Optionally, the device 1200 may further include a transceiving unit 1206. The transceiving unit 1206 may be configured to receive an access request from a serving cell, and the access determination unit 1202 may be configured to determine the access requirement based on the access request from the serving cell. The serving cell is a cell serving the user equipment currently, which may be a macro cell or a small cell, and no limitation will be made in the disclosure in this regard.

Upon reception of the access request, the control unit 1204 may respond to the access request to transmit to the serving cell by the transceiving unit 1206 a notification indicating a variation of the PCI of the target small cell, that is, when the target small cell transforms from the off state to the on state, the PCI of the target small cell is changed from the in-cluster general PCI to the in-cluster unique PCI selected from the in-cluster available PCI set. It should be understood that this indication can be explicit or implicit.

In a case of implicitly indicating the variation of the PCI, the user equipment needs to perform downlink synchronization with the target small cell to obtain the new PCI of the target small cell, which corresponds to the case shown in FIG. 10.

In a case of explicitly indicating the variation of the PCI, the notification may also include the new PCI allocated to the target small cell in the on state by the control unit, thus the serving cell can directly obtain the new PCI of the target small cell from the received notification, which corresponds to the case shown in FIG. 11.

Next, a functional configuration example of a device on the serving cell side according to an embodiment of the disclosure is described with reference to FIG. 13. FIG. 13 is a block diagram illustrating a functional configuration example of a device in a wireless communication system according to an embodiment of the disclosure. The device is located on the serving cell side.

Figure 13:
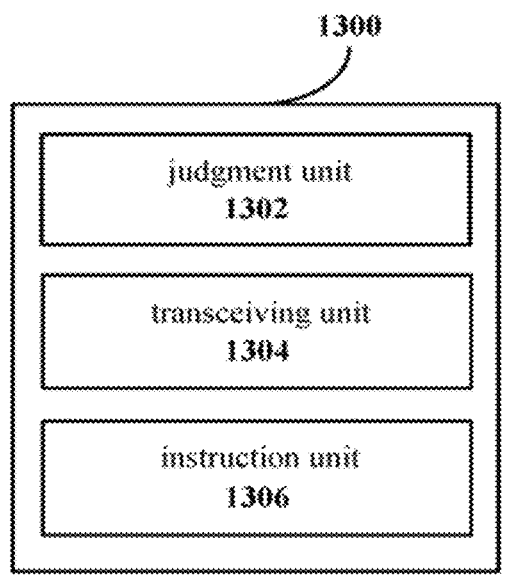
FIG. 13 is a block diagram illustrating a functional configuration example of a device in a wireless communication system according to an embodiment of the disclosure.

As shown in FIG. 13, a device 1300 may include a judgment unit 1302, a transceiving unit 1304 and an instruction unit 1306.

The judgment unit 1302 may be configured to judge whether a user equipment needs to get access to a target small cell among neighboring small cells from a serving cell in which the device 1300 locates according to measurement results for discovery reference signals of the neighboring small cells by the user equipment, the user equipment being served by the serving cell.

The transceiving unit 1304 may be configured to transmit an access request to the target small cell and receive a response to the access request from the target small cell, in a case that the judgment unit 1302 judges that the user equipment needs to get access to the target small cell from the serving cell.

The instruction unit 1306 may be configured to transmit an instruction to the user equipment according to the received response, such that the user equipment gets access to the target small cell according to a new PCI of the target small cell, the instruction including control information for getting access to the target small cell. The new PCI is a PCI newly allocated to the target small cell when the target small cell transforms from an off state to an on state and is different from a PCI used in the off state. For example, as described above, the PCI used in the off state is the in-cluster general PCI, and the new PCI is the in-cluster unique PCI selected from the in-cluster available PCI set.

Preferably, the instruction transmitted by the instruction unit 1306 to the user equipment may include a resynchronization instruction for instructing the user equipment to perform downlink resynchronization with the target small cell, such that the user equipment obtains the new PCI of the target small cell form the target small cell (which corresponds to the case shown in FIG. 10). Alternatively, the instruction may also include the new PCI of the target small cell, such that the user equipment can directly obtain the new PCI of the target small cell from the instruction without performing downlink resynchronization with the target small cell (which corresponds to the case shown in FIG. 11).

Figure 14:
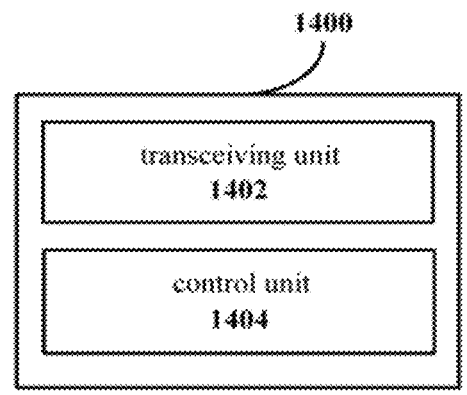
FIG. 14 is a block diagram illustrating a functional configuration example of a device on user equipment side in a wireless communication system according to an embodiment of the disclosure.

FIG. 14 is a block diagram illustrating a functional configuration example of a device on the user equipment side in a wireless communication system according to an embodiment of the disclosure.

As shown in FIG. 14, a device 1400 may include a transceiving unit 1402 and a control unit 1404.

The transceiving unit 1402 may be configured to transmit measurement results for discovery reference signals of neighboring small cells by the user equipment to a serving cell and receive from the serving cell an access instruction about get accessing to a target small cell among the neighboring small cells.

The control unit 1404 may be configured to acquire a new PCI of the target small cell based on the access instruction, so as to get access to the target small cell according to the new PCI. The new PCI is a PCI newly allocated to the target small cell when the target small cell transforms from an off state to an on state and is different from a PCI used in the off state. For example, as described above, the PCI used in the off state is the in-cluster general PCI, and the new PCI is the in-cluster unique PCI selected from the in-cluster available PCI set.

Preferably, the access instruction may include a resynchronization instruction for instructing the user equipment to perform downlink resynchronization with the target small cell, and the control unit 1404 may perform downlink resynchronization with the target small cell according to the resynchronization instruction so as to acquire the new PCI of the target small cell, and control the user equipment to get access to the target small cell according to the new PCI (which corresponds to the case shown in FIG. 10). Alternatively, the access instruction may also include the new PCI of the target small cell, such that the control unit 1404 may directly control the user equipment to get access to the target small cell according to the new PCI in the access instruction without performing downlink resynchronization with the target small cell (which corresponds to the case shown in FIG. 11).

It should be understood that although the functional configuration examples of the devices in the wireless communication system according to the embodiments of the present disclosure are described as above, these are only examples rather than limitations, and a person skilled in the art can modify the above embodiments in accordance with principles of the present disclosure, for example, add, delete or combine function modules in each of the embodiments or the like, and such modifications each fall within the scope of the present disclosure.

Corresponding to the devices according to the embodiments of the disclosure, methods in a wireless communication system are further provided according to the disclosure. In the following, procedure examples of the methods in the wireless communication system according to the embodiments of the disclosure are described with reference to FIGS. 15 to 18.

Figure 15:
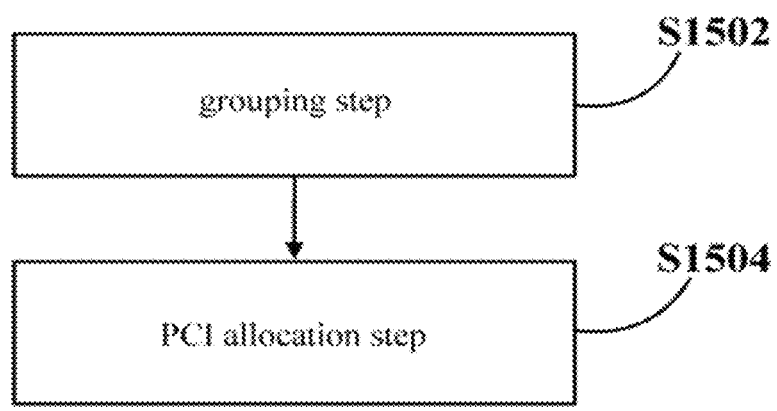
FIG. 15 is a flow chart illustrating a procedure example of a method in a wireless communication system according to an embodiment of the disclosure.

FIG. 15 is a flow chart illustrating a procedure example of a method in a wireless communication system according to an embodiment of the disclosure. The method shown in FIG. 15 corresponds to the device in the wireless communication system described above with reference to FIGS. 1 and 2.

As shown in FIG. 15, in a grouping step S1502, PCIs are grouped according to values of the PCIs in a predetermined grouping manner.

Next, in a PCI allocation step S1504, PCIs are dynamically allocated to each of small cells in a small cell cluster based on on/off state of the small cells in the small cell cluster according to at least the grouping of the PCIs. Preferably, a PCI of each small cell in the off state is different from a PCI of the small cell in the on state.

Figure 16:
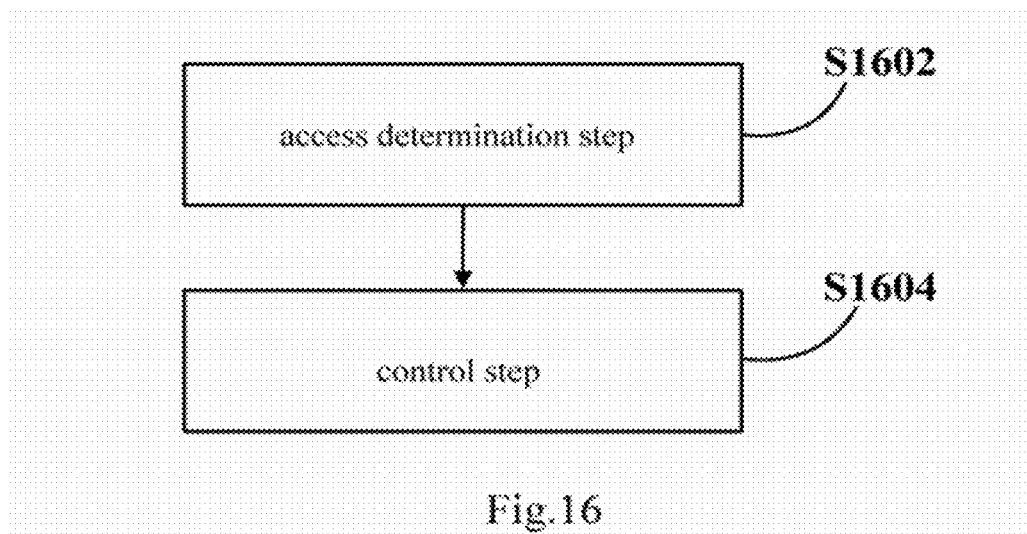
FIG. 16 is a flow chart illustrating a procedure example of a method in a wireless communication system according to an embodiment of the disclosure.

FIG. 16 is a flow chart illustrating a procedure example of a method in a wireless communication system according to an embodiment of the disclosure. The method shown in FIG. 16 corresponds to the device in the wireless communication system described above with reference to FIG. 12, and may be performed at the target small cell side.

As shown in FIG. 16, in an access determination step S1602, an access requirement of a user equipment is determined. The access requirement may include but is not limited to for example a handover requirement, a dual-connection requirement, a cross-site carrier aggregation requirement or the like.

Next, in a control step S1604, based on the access requirement of the user equipment, a target small cell is transformed from an off state to an on state and a new PCI which is different from a PCI used in the off state is re-allocated to the target small cell.

Figure 17:
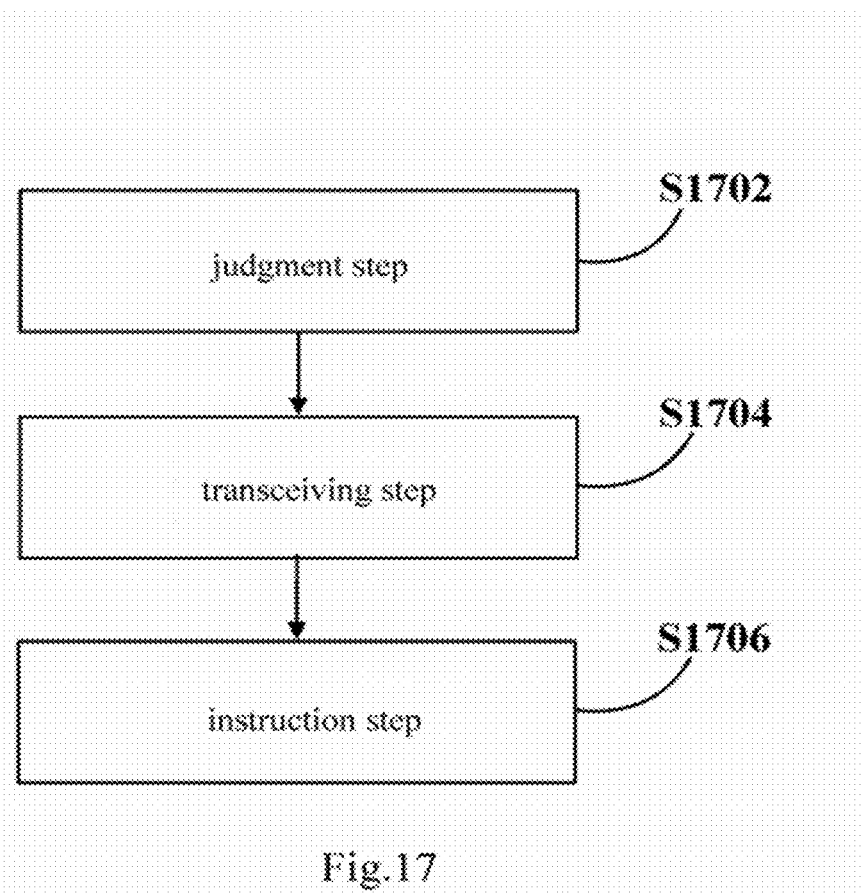
FIG. 17 is a flow chart illustrating a procedure example of a method in a wireless communication system according to an embodiment of the disclosure.

FIG. 17 is a flow chart illustrating a procedure example of a method in a wireless communication system according to an embodiment of the disclosure. The method shown in FIG. 17 corresponds to the device in the wireless communication system described above with reference to FIG. 13, and may be performed on the serving cell side.

As shown in FIG. 17, in a judgment step S1702, it is judged whether a user equipment needs to get access to a target small cell among neighboring small cells from a serving cell according to measurement results for discovery reference signals of the neighboring small cells by the user equipment, the user equipment being served by the serving cell.

Next, in a transceiving step S1704, in a case that it is judged the user equipment needs to get access to the target small cell from the serving cell, an access request is transmitted to the target small cell and a response to the access request is received from the target small cell.

Then in an instruction step S1706, an instruction is transmitted to the user equipment according to the received response, such that the user equipment gets access to the target small cell according to a new PCI of the target small cell, the instruction including control information for getting access to the target small cell. The new PCI is a PCI newly allocated to the target small cell when the target small cell transforms from an off state to an on state and is different from a PCI used in the off state. Preferably, the instruction may include a resynchronization instruction for instructing the user equipment to perform downlink resynchronization with the target small cell (for example, referring to FIG. 10). Alternatively, the instruction may also include the new PCI of the target small cell (for example, referring to FIG. 11).

Figure 18:
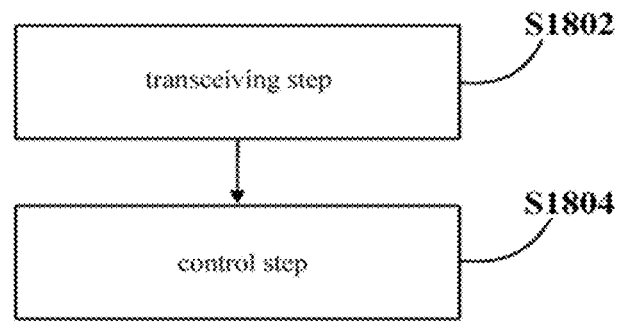
FIG. 18 is a flow chart illustrating a procedure example of a method in a wireless communication system according to an embodiment of the disclosure.

FIG. 18 is a flow chart illustrating a procedure example of a method in a wireless communication system according to an embodiment of the disclosure. The method shown in FIG. 18 corresponds to the device in the wireless communication system described above with reference to FIG. 14, and may be performed on the user equipment side.

As shown in FIG. 18, in a transceiving step S1802, measurement results for discovery reference signals of neighboring small cells by user equipment are transmitted to a serving cell and an access instruction about getting access to a target small cell among the neighboring small cells is received from the serving cell.

Next, in a control step S1804, a new PCI of the target small cell is acquired based on the access instruction, so as to get access to the target small cell according to the new PCI. The new PCI is a PCI newly allocated to the target small cell when the target small cell transforms from an off state to an on state and is different from a PCI used in the off state.

It should be noted that although the example procedures of the methods in the wireless communication system according to the embodiments of the present disclosure are described as above, these are only examples rather than limitations, and a person skilled in the art can modify the above embodiments in accordance with principles of the present disclosure, for example, add, delete or combine the steps in each of the embodiments or the like, and such modifications each fall within the scope of the present disclosure.

In addition, it should be noted that the method embodiments here correspond to the above-described device embodiments. Therefore, as for the contents not described in detail in the method embodiments, reference may be made to the corresponding description in the device embodiments, and no description will be repeated herein.

It should be understood that machine executable instructions in a storage medium and a program product according to an embodiment of the present disclosure may be also configured to perform the methods corresponding to the device embodiments, and hence the contents which are not described in detail here may be referred to corresponding descriptions above, and are not repeated here.

Accordingly, a storage medium on which the above program product storing machine executable instructions is carried is also included in the disclosure. The storage medium includes but not limited to a floppy disk, an optical disk, a magneto-optical disk, a storage card, a memory rod and the like.

Furthermore, it shall be noted that the foregoing series of processes and devices can also be embodied in software and/or firmware. In the case of being embodied in software and/or firmware, a program constituting the software is installed from a storage medium or a network to a computer with a dedicated hardware structure, e.g., a general purpose personal computer 1900 illustrated in FIG. 19, which can perform various functions when various programs are installed thereon.

Figure 19:
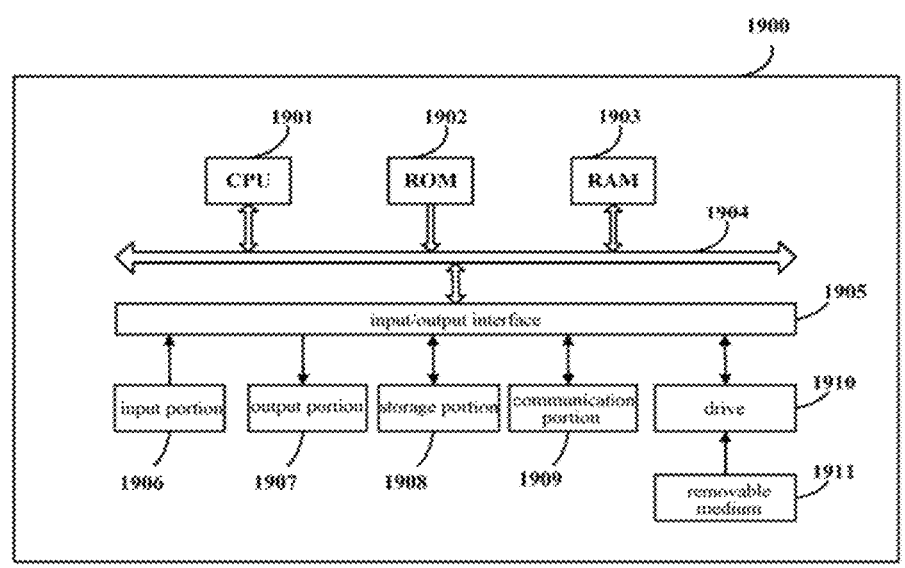
FIG. 19 is a block diagram illustrating an example structure of a personal computer as an information processing apparatus that may be adopted in the embodiment of the disclosure.

In FIG. 19, a Central Processing Unit (CPU) 1901 performs various processes according to a program stored in a Read Only Memory (ROM) 1902 or loaded from a storage portion 1908 into a Random Access Memory (RAM) 1903 in which data required when the CPU 1901 performs the various processes is also stored as needed.

The CPU 1901, the ROM 1902 and the RAM 1903 are connected to each other via a bus 1904 to which an input/output interface 1905 is also connected.

The following components are connected to the input/output interface 1905: an input portion 1906 including a keyboard, a mouse, etc.; an output portion 1907 including a display, e.g., a Cathode Ray Tube (CRT), a Liquid Crystal Display (LCD), etc., a speaker, etc.; a storage portion 1908 including a hard disk, etc.; and a communication portion 1909 including a network interface card, e.g., an LAN card, a modem, etc. The communication portion 1909 performs a communication process over a network, e.g., the Internet.

A drive 1910 is also connected to the input/output interface 1905 as needed. A removable medium 1911, e.g., a magnetic disk, an optical disk, an magneto optical disk, a semiconductor memory, etc., can be installed on the drive 1910 as needed so that a computer program fetched therefrom can be installed into the storage portion 1908 as needed.

In the case that the foregoing series of processes are performed in software, a program constituting the software is installed from a network, e.g., the Internet, etc., or a storage medium, e.g., the removable medium 1911, etc.

Those skilled in the art shall appreciate that such a storage medium will not be limited to the removable medium 1911 illustrated in FIG. 19 in which the program is stored and which is distributed separately from the apparatus to provide a user with the program. Examples of the removable medium 1911 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1902, a hard disk included in the storage portion 1908, etc., in which the program is stored and which is distributed together with the apparatus including the same to the user.

In the following, application examples with regard to the disclosure are provided.

The technique according to the disclosure is applicable to various products. For example, the above devices 100 and 200 may be implemented as any type of server such as a tower server, a rack server and a blade server. The server is commonly disposed on the core network side and may be used for implementing the PCI allocation function according to the disclosure. The devices 100 and 200 may also be control modules (such as an integrated circuit module including a single dice, and a card or blade inserted into a slot of the blade server) mounted on the server.

For example, the base station of the serving cell, the base station of the target small cell and the like may be implemented as any type of evolved node B (eNB), such as a macro eNB and a small eNB. The small eNB may be an eNB which covers a cell smaller than a macro cell, such as a pico eNB, a micro eNB and a home (femto) eNB. Alternatively, the base station of the serving cell and the base station of the target small cell may be implemented as any other type of base station, such as NodeB and a base station transceiver (BTS). It is to be noted that, the PCI allocation function may also be implemented by a macro base station or a small base station, and as for the structure of the base station for implementing the PCI allocation function, reference may be made to the description in this section. The base station of the serving cell and the base station of the target small cell may include: a main body (also referred to as a base station equipment) configured to control wireless communication, and one or more remote radio heads (RRHs) disposed in a different place from the main body. Further, with the development of C-RAN (Centralized, Cooperative, Cloud RAN), the main body controlling the wireless communication may also be a base-band cloud processing apparatus such as a server. Further, various types of terminals, which will be described below, may operate as a base station by temporarily or semi-persistently performing a base station function.

For example, the user equipment may be realized as a mobile terminal (such as a smartphone, a tablet personal computer (PC), a notebook PC, a smart wearable device, a portable game terminal, a portable/dongle type mobile router and a digital camera) or an in-vehicle terminal (such as a car navigation apparatus). The user equipment may also be realized as a terminal (that is also referred to as a machine type communication (MTC) terminal) that performs machine-to-machine (M2M) communication. In addition, the user equipment may be a wireless communication module (such as an integrated circuit module including a single die) installed on each of the terminals.

Figure 20:
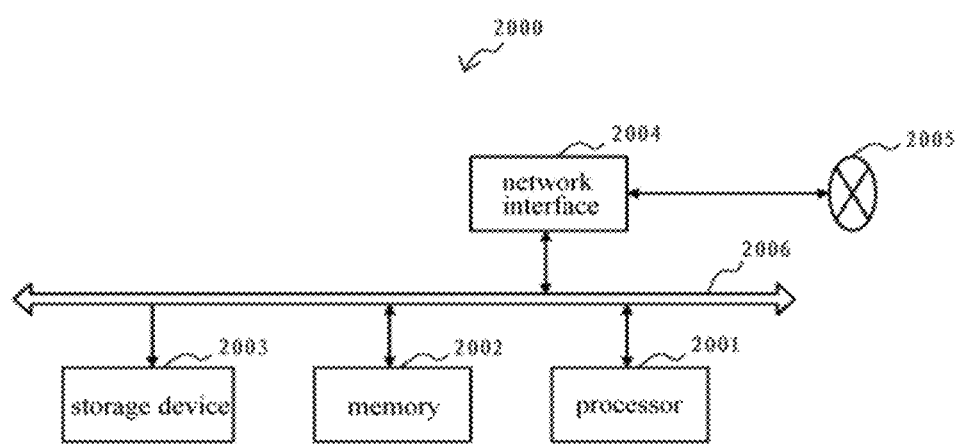
FIG. 20 is a block diagram illustrating an example of a schematic configuration of a server to which the technology of the disclosure may be applied.

1. An Application Example of a Device for Implementing the PCI Allocation Function FIG. 20 is a block diagram showing an example of a schematic configuration of a server 2000 to which the technology of the disclosure may be applied. The server 2000 includes a processor 2001, a memory 2002, a storage device 2003, a network interface 2004 and a bus 2006.

The processor 2001 may be for example the central processing unit (CPU) or the digital signal processor (DSP), and control the function of the server 2000. The memory 2002 includes a random access memory (RAM) and a read-only memory (ROM), and stores data and a program that is executed by the processor 2001. The storage device 2003 may include a storage medium, such as a semiconductor memory and a hard disk.

The network interface 2004 is a wired communication interface for connecting the server 2000 to a wired communication network 2005. The wired communication network 2005 may be a core network such as an Evolved Packet Core (EPC), or a packet data network (PDN) such as the Internet.

The bus 2006 connects the processor 2001, the memory 2002, the storage device 2003 and the network interface 2004 to each other. The bus 2006 may include two or more buses (such as a high-speed bus and a low-speed bus) each of which has different speed.

In the server 2000 as shown in FIG. 20, the grouping unit, the PCI allocation unit and the in-cluster PCI set allocation unit described using FIG. 1 and FIG. 2 may be implemented by the processor 2001.

2. Application Examples Regarding a Base Station

First Application Example

Figure 21:
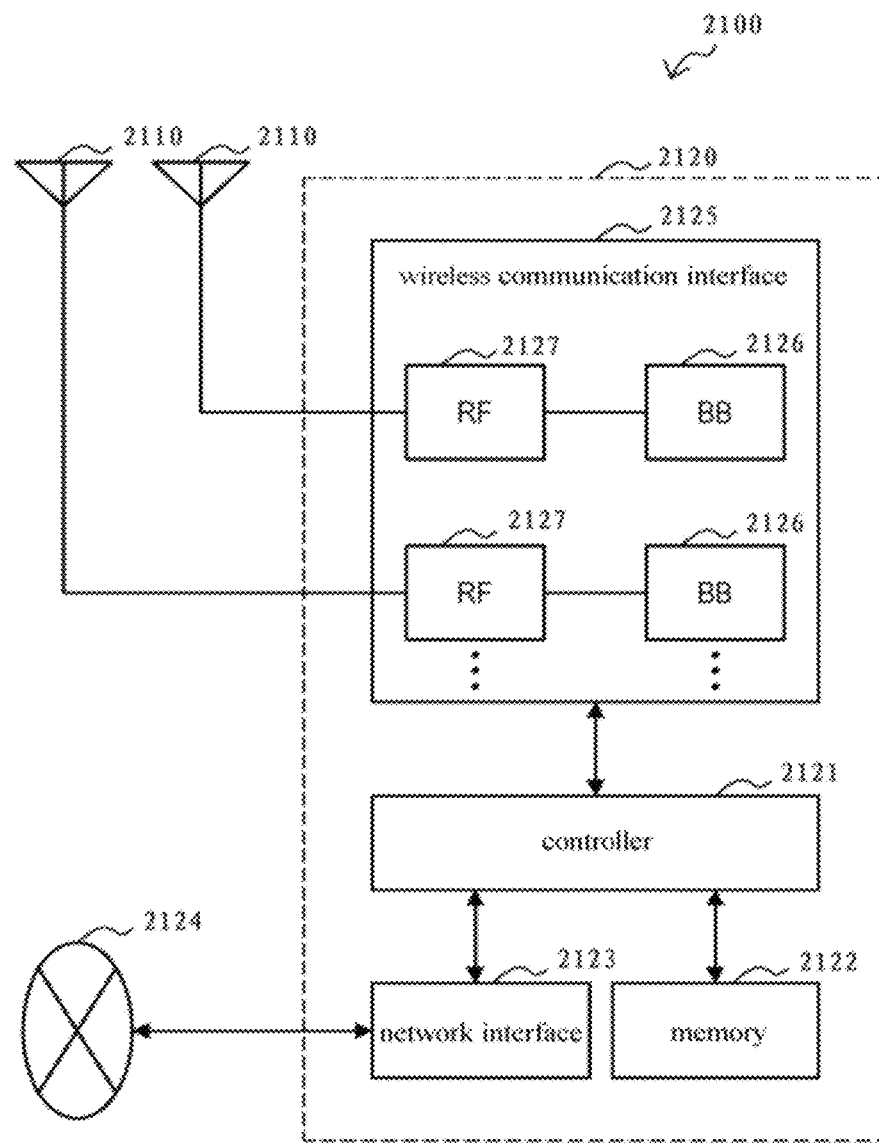
FIG. 21 is a block diagram illustrating a first example of a schematic configuration of an evolved node B (eNB) to which the technology of the disclosure may be applied.

FIG. 21 is a block diagram showing a first example of a schematic configuration of an eNB to which the technology of the disclosure may be applied. The eNB 2100 includes one or more antennas 2110 and a base station apparatus 2120. The base station apparatus 2120 and each of the antennas 2110 may be connected to each other via an RF cable.

Each of the antennas 2110 includes one or more antenna element (such as multiple antenna elements included in an multiple-input multiple-output (MIMO) antenna), and is used for the base station apparatus 2120 to transmit and receive wireless signals. As shown in FIG. 21, the eNB 2100 may include multiple antennas 2110. For example, the multiple antennas 2110 may compatible with the multiple frequency bands used by the eNB 2100. Although an example of the eNB 2100 including multiple antennas 2110 is shown in FIG. 21, the eNB 2100 may also include a single antenna 2110.

The base station apparatus 2120 includes a controller 2121, a memory 2122, a network interface 2123 and a wireless communication interface 2125.

The controller 2121 may be for example a CPU or a DSP, and operates various functions of a higher level of the base station apparatus 2120. For example, the controller 2121 generates a data packet from data in signals processed by the wireless communication interface 2125, and transfers the generated packet via the network interface 2123. The controller 2121 may bundle data from multiple base band processors to generate the bundled packet, and transfer the generated bundled packet. The controller 2121 may have logical functions of performing control such as radio resource control, radio bearer control, mobility management, admission control and scheduling. The control may be performed in corporation with an eNB or core network node in the vicinity. The memory 2122 includes RAM and ROM, and stores a program that is executed by the controller 2121 and various types of control data (such as a terminal list, transmission power data and scheduling data).

The network interface 2123 is a communication interface for connecting the base station apparatus 2120 to a core network 2124. The controller 2121 may communicate with a core network node or another eNB via the network interface 2123. In this case, the eNB 2100, and the core network node or the other eNB may be connected to each other via a logical interface (such as an S1 interface and an X2 interface). The network interface 2123 may also be a wired communication interface or a wireless communication interface for wireless backhaul. If the network interface 2123 is a wireless communication interface, the network interface 2123 may use a higher frequency band for wireless communication than a frequency band used by the wireless communication interface 2125.

The wireless communication interface 2125 supports any cellular communication scheme such as long term evolution (LTE) and the LTE-advanced, and provides wireless connection to a terminal located in a cell of the eNB 2100 via the antenna 2110. The wireless communication interface 2125 may typically include for example a base band (BB) processor 2126 and an RF circuit 2127. The BB processor 2126 may perform for example encoding/decoding, modulation/demodulation and multiplexing/de-multiplexing, and performs various types of signal processing of layers (for example L1, medium access control (MAC), radio link control (RLC) and packet data convergence protocol (PDCP)). Instead of the controller 2121, the BB processor 2126 may have a part or all of the above logical functions. The BB processor 2126 may be a memory storing a communication control program, or a module including a processor and a related circuit configured to perform the program. Updating the program may change the functions of the BB processor 2126. The module may be a card or blade inserted into a slot of the base station apparatus 2120. Alternatively, the module may be a chip mounted on the card or the blade. The RF circuit 2127 may include for example a mixer, a filter and an amplifier, and transmits and receives wireless signals via the antenna 2110.

As shown in FIG. 21, the wireless communication interface 2125 may include multiple BB processors 2126. For example, the multiple BB processors 2126 may be compatible with multiple frequency bands used by the eNB 2100. As shown in FIG. 21, the wireless communication interface 2125 may include multiple RF circuits 2127. For example, the multiple RF circuits 2127 may be compatible with multiple antenna elements. Although an example in which the wireless communication interface 2125 including multiple BB processors 2126 and multiple RF circuits 2127 is shown in FIG. 21, the wireless communication interface 2125 may include a single BB processor 2126 and a single RF circuit 2127.

2. Second Application Example

Figure 22:
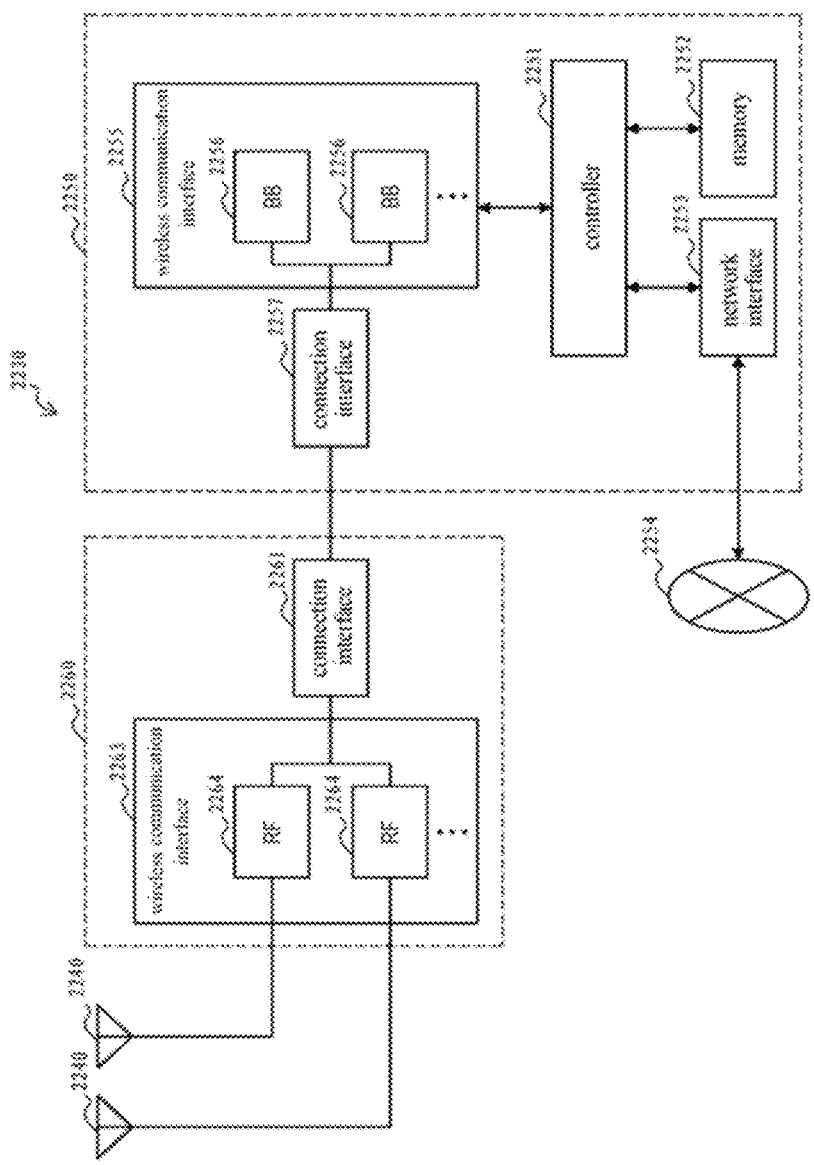
FIG. 22 is a block diagram illustrating a second example of a schematic configuration of an eNB to which the technology of the disclosure may be applied.

FIG. 22 is a block diagram showing a second example of a schematic configuration of an eNB to which the technique of the disclosure may be applied. The eNB 2230 includes one or more antennas 2240, a base station apparatus 2250 and a RRH 2260. The RRH 2260 and each of the antennas 2240 may be connected to each other via an RF cable. The base station apparatus 2250 and the RRH 2260 may be connected to each other via a high-speed line, such as an optical fiber cable.

Each of the antennas 2240 includes one or more antenna element (such as the multiple antenna elements included in the MIMO antenna), and is used for the RRH 2260 to transmit and receive wireless signals. As shown in FIG. 22, the eNB 2230 may include multiple antennas 2240. For example, the multiple antennas 2240 may be compatible with the multiple frequency bands used by the eNB 2230. Although the eNB 2230 including multiple antennas 2240 is shown in FIG. 22, the eNB 2230 may include a single antenna 2240.

The base station apparatus 2250 includes a controller 2251, a memory 2252, a network interface 2253, a wireless communication interface 2255 and a connection interface 2257. The controller 2251, the memory 2252 and the network interface 2253 are respectively the same as the controller 2121, the memory 2122 and the network interface 2123 described referring to FIG. 21.

The wireless communication interface 2255 supports any cellular communication scheme such as LTE and LTE-advanced, and provides wireless connection to a terminal located in a sector corresponding to the RRH 2260 via the RRH 2260 and the antenna 2240. The wireless communication interface 2255 may typically include for example a base band (BB) processor 2256. Except the BB processor 2256 is connected to the RF circuit 2264 of the RRH 2260 via the connection interface 2257, the BB processor 2256 is the same as the BB processor 2126 described referring to FIG. 21. As shown in FIG. 22, the wireless communication interface 2255 may include multiple BB processors 2256. For example, the multiple BB processors 2256 may be compatible with the multiple frequency bands used by the eNB 2230. Although an example in which the wireless communication interface 2255 including multiple BB processors 2256 is shown in FIG. 22, the wireless communication interface 2255 may also include a single BB processor 2256.

The connection interface 2257 is an interface for connecting the base station apparatus 2250 (the wireless communication interface 2255) to the RRH 2260. The connection interface 2257 may also be a communication module for communication in the high-speed line that connects the base station apparatus 2250 (the wireless communication interface 2255) to the RRH 2260.

The RRH 2260 includes a connection interface 2261 and a wireless communication interface 2263.

The connection interface 2261 is an interface for connecting the RRH 2260 (the wireless communication interface 2263) to the base station apparatus 2250. The connection interface 2261 may also be a communication module in the high-speed line.

The wireless communication interface 2263 transmits and receives wireless signals via the antenna 2240. The wireless communication interface 2263 may typically include for example a RF circuit 2264. The RF circuit 2264 may include for example a mixer, a filter and an amplifier, and transmits and receives the wireless signal via the antenna 2240. As shown in FIG. 22, the wireless communication interface 2263 may include multiple RF circuits 2264. For example, the multiple RF circuits 2264 may support multiple antenna elements. Although an example in which the wireless communication interface 2263 including multiple RF circuits 2264 is shown in FIG. 22, the wireless communication interface 2263 may also include a single RF circuit 2264.

In the eNB 2100 and eNB 2230 shown in FIG. 21 and FIG. 22, the transceiving unit 1206 and the transceiving unit 1304 described referring to FIG. 12 and FIG. 13 may be implemented by the wireless communication interface 2125 and the wireless communication interface 2255 and/or the wireless communication interface 2263. At least a part of the functions may be implemented by the controller 2121 and the controller 2251.

Preferred embodiments of the disclosure have been described above with reference to the drawings, but the disclosure is not limited to the above examples of course. Those skilled in the art may devise various alternations and modifications within the scope of the appended claims, and it should be understood that these alternations and modifications would naturally fall within the technical scope of the disclosure.

For example, multiple functions included in one unit in the above embodiments may be implemented by separated devices. Alternatively, multiple functions implemented by multiple units in the above embodiments may be implemented by separated devices respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

The invention claimed is:

1. A device in a wireless communication system, comprising processing circuitry configured to:
   determine an access requirement of a user equipment by receiving an access request from a serving cell and determining the access requirement of the user equipment based on the access request, and wherein the serving cell is a cell currently serving the user equipment; and
   transform a target small cell in which the device locates from an off state to an on state and re-allocate a new Physical cell ID (PCI) which is different from a PCI used in the off state to the target small cell, based on the access requirement of the user equipment, wherein a response to the access request comprises transmitting a notification indicating a variation of the PCI of the target small cell to the serving cell, and wherein the notification comprises the new PCI of the target small cell.

2. The device according to claim 1, wherein when the target small cell is in the off state, the PCI of the target small cell is an in-cluster general PCI shared by a plurality of small cells in the off state within a small cell cluster in which the target small cell locates, in-cluster general PCIs of different small cell clusters within a predetermined range being different from each other, and when the target small cell is in the on state, the new PCI of the target small cell is an in-cluster unique PCI selected from an in-cluster available PCI set of the small cell cluster in which the target small cell locates, the in-cluster available PCI set being a set of in-cluster unique PCIs available when all small cells within the small cell cluster are in the on state.

3. A device in a wireless communication system, the device comprising processing circuitry configured to:
   judge whether a user equipment needs to get access to a target small cell among neighboring small cells from a serving cell in which the device locates according to measurement results for discovery reference signals of the neighboring small cells by the user equipment, the user equipment being served by the serving cell;
   transmit an access request to the target small cell and receive a response to the access request from the target small cell, in a case that it is judged that the user equipment needs to get access to the target small cell from the serving cell; and
   transmit an instruction to the user equipment according to the response, such that the user equipment gets access to the target small cell according to a new Physical cell ID (PCI) of the target small cell, wherein the instruction comprises control information for getting access to the target small cell,
   wherein the new PCI of the target small cell is a PCI newly allocated to the target small cell when the target small cell transforms from an off state to an on state and is different from a PCI used in the off state.

4. The device according to claim 3, wherein when the target small cell is in the off state, the PCI of the target small cell is an in-cluster general PCI shared by a plurality of small cells in the off state within a small cell cluster in which the target small cell locates, in-cluster general PCIs of different small cell clusters within a predetermined range being different from each other, and when the target small cell is in the on state, the new PCI of the target small cell is an in-cluster unique PCI selected from an in-cluster available PCI set of the small cell cluster in which the target small cell locates, the in-cluster available PCI set being a set of in-cluster unique PCIs available when all small cells within the small cell cluster are in the on state.

5. The device according to claim 3, wherein the instruction comprises a resynchronization instruction for instructing the user equipment to perform downlink resynchronization with the target small cell, such that the user equipment obtains the new PCI of the target small cell.

6. The device according to claim 3, wherein the instruction comprises the new PCI of the target small cell.

7. A device on user equipment side in a wireless communication system, the device comprising processing circuitry configured to:
   transmit measurement results for discovery reference signals of neighboring small cells by the user equipment to a serving cell and receive from the serving cell an access instruction about getting access to a target small cell among the neighboring small cells, wherein the serving cell is a cell serving the user equipment currently; and
   acquire a new Physical cell ID (PCI) of the target small cell based on the access instruction, so as to control the user equipment to get access to the target small cell according to the new PCI,
   wherein the new PCI of the target small cell is a PCI newly allocated to the target small cell when the target small cell transforms from an off state to an on state and is different from a PCI used in the off state and wherein the access instruction comprises a resynchronization instruction for instructing the user equipment to perform downlink resynchronization with the target small cell, and the processing circuitry is configured to perform downlink resynchronization with the target small cell according to the resynchronization instruction so as to acquire the new PCI of the target small cell, and control the user equipment to get access to the target small cell according to the new PCI.

8. The device according to claim 7, wherein when the target small cell is in the off state, the PCI of the target small cell is an in-cluster general PCI shared by a plurality of small cells in the off state within a small cell cluster in which the target small cell locates, in-cluster general PCIs of different small cell clusters within a predetermined range being different from each other, and when the target small cell is in the on state, the new PCI of the target small cell is an in-cluster unique PCI selected from an in-cluster available PCI set in the small cell cluster in which the target small cell locates, the in-cluster available PCI set being a set of in-cluster unique PCIs available when all small cells within the small cell cluster are in the on state.

9. The device according to claim 7, wherein the access instruction comprises the new PCI of the target small cell, and the processing circuitry is configured to control the user equipment to get access to the target small cell according to the new PCI included in the access instruction.

* * * * *